US012791570B2

(12) United States Patent
Joseph et al.

(10) Patent No.: US 12,791,570 B2
(45) Date of Patent: Nov. 10, 2026

(54) AUTOMATED COVERSLIPPER FOR LARGE FORMAT SLIDES WITH SWITCHABLE COMPATIBILITY TO HANDLE MULTI FORMAT SLIDES

(71) Applicant: INDIAN INSTITUTE OF TECHNOLOGY MADRAS (IIT Madras), Chennai Tamil Nadu (IN)

(72) Inventors: Jayaraj Joseph, Chennai Tamil Nadu (IN); Mohanasankar Sivaprakasam, Chennai Tamil Nadu (IN); Jayaraman Kiruthi Vasan, Chennai Tamil Nadu (IN); Ramdayalan K, Chennai Tamil Nadu (IN); Rahul Manoj, Chennai Tamil Nadu (IN); Sudhan Chandrasekaran, Chennai Tamil Nadu (IN); Hari P Narayanan, Tamil Nadu (IN)

(73) Assignee: INDIAN INSTITUTE OF TECHNOLOGY MADRAS (IIT Madras), Chennai Tamil Nadu (IN)

( * ) Notice: Subject to any disclaimer, the term of this patent is extended or adjusted under 35 U.S.C. 154(b) by 446 days.

(21) Appl. No.: 18/575,482

(22) PCT Filed: Jun. 30, 2022

(86) PCT No.: PCT/IN2022/050598
§ 371 (c)(1),
(2) Date: Dec. 29, 2023

(87) PCT Pub. No.: WO2023/275894
PCT Pub. Date: Jan. 5, 2023

(65) Prior Publication Data
US 2024/0329066 A1 Oct. 3, 2024

(30) Foreign Application Priority Data
Jul. 1, 2021 (IN) ............................ 202141029702

(51) Int. Cl.
*G01N 35/00* (2006.01)
*G01N 35/10* (2006.01)

(52) U.S. Cl.
CPC ....... *G01N 35/00029* (2013.01); *G01N 35/10* (2013.01); *G01N 2035/00079* (2013.01); *G01N 2035/00138* (2013.01)

(58) Field of Classification Search
CPC .................... G01N 1/312; G01N 1/36; G01N 2035/00059; G01N 2035/00079;
(Continued)

(56) References Cited

U.S. PATENT DOCUMENTS

2008/0029218 A1* 2/2008 Reinhardt ................ B65H 1/08
156/719
2017/0115476 A1* 4/2017 Ewoniuk .......... G01N 35/00029

* cited by examiner

*Primary Examiner* — Jennifer Wecker
*Assistant Examiner* — Jonathan Bortoli
(74) *Attorney, Agent, or Firm* — Nath, Goldberg & Meyer; Joshua B. Goldberg

(57) ABSTRACT

A system for performing coverslipping includes multiple zones, where a coverslipper device is designated to move from one or more zones. An input zone comprises a slide tray, which comprises a stack of stained slides and a slide that is designated to be picked up by a slide pick-up platform. The picked-up slide reaches a dispensation zone and a mountant medium is dispensed via a nozzle and the slide pickup platform moves to a coverslipping zone. The coverslipper device picks the cover slips from a slip pick-up zone and moves to a coverslipping zone. The slide pick-up platform positions itself in the coverslipping zone while the picked coverslip is mounted over the slide. The processed cover slipped slide is transported by a slide conveyor and inserted into a slide tray, which is moved up and down and is positioned to accommodate the next processed slide.

17 Claims, 29 Drawing Sheets

(58) Field of Classification Search
CPC .......... G01N 2035/00089; G01N 2035/00138; G01N 35/00029; G01N 35/10; G02B 21/34; B66F 9/07568
See application file for complete search history.

AUTOMATED COVERSLIPPER FOR LARGE FORMAT SLIDES WITH SWITCHABLE COMPATIBILITY TO HANDLE MULTI FORMAT SLIDES

FIELD OF INVENTION

Embodiments of the present application illustrates a device that performs coverslipping over large format slides, more particularly, an automated coverslipper for large format slides with switchable compatibility to handle multiple format slides, which effectively avoid air bubble formation between the coverslip and the slide.

BACKGROUND OF THE INVENTION

As known in the art, coverslipping is the process by which protective glass sheets are pasted over glass slides with tissue specimens. The primary goal of this process is to protect the specimen from external environment and impacts, and to improve the visibility by straightening the tissue. In the current art, coverslipping is performed on slides that are smaller in size. For example, a standard microscope slide measures about 75 mm×25 mm (3 inch by 1 inch) and is about 0.2 mm thick. A range of other sizes are available for various special purposes, such as 75×50 mm for geological use, 46×27 mm for petrographic studies, 48×28 mm for thin sections, and 125×175 mm for large tissue sections. Generally, the presently available automated coverslippers can only handle smaller slide sizes, typically, 25×75 mm (1"×3") slides and are incompatible to process large format slides and cannot switch between different sizes of slides.

However, there is a necessity to provide an efficient way to automate coverslipping of large format histology slides, for example, (150×200 mm) while retaining compatibility to medium and small slides also. Current commercial products can only process only 1×3 slides. Being an electromechanical device and since the size of the slide is large, there is a need for a device that needs to be controlled by a custom defined protocol logic to perform error free coverslipping of such large format slides. The device should be capable of handling transport of stacks of such large format slides and continuously performs the process. The automation should also result in error-free, uniform coverslipping by preventing air-pockets between the coverslip and the slides. There is also the need to take into consideration that to apply the slip permanently over the slide, an adhesive liquid called mountant medium is dispensed over the glass slide. Therefore, there is this need for an improved coverslipping and dispensing technique that ensures uniform distribution of mountant medium thus ensuring zero or minimal in-significant air gaps.

SUMMARY OF THE INVENTION

The following presents a simplified summary of the subject matter to provide a basic understanding of some of the aspects of subject matter embodiments. This summary is not an extensive overview of the subject matter. It is not intended to identify key/critical elements of the embodiments or to delineate the scope of the subject matter. Its sole purpose to present some concepts of the subject matter in a simplified form as a prelude to the more detailed description that is presented later.

A system disclosed here addresses the need for an improved coverslipping and dispensing technique that ensures uniform distribution of mountant medium for ensuring zero or minimal in-significant air gaps. The system for performing coverslipping includes a coverslipper device, an input zone, a dispensation zone, a slip pick-up zone, a coverslipping zone, and an output zone. The coverslipper device is assembled onto a frame and designated to move from one or more zones. The input zone comprises a slide tray, where the slide tray comprises a stack of stained slides, and a slide is designated to be picked up by a slide pick-up platform. The slide picked up by the slide pick-up platform reaches the dispensation zone, and a mountant medium is dispensed via a wedge-shaped nozzle and slide pickup platform moves to coverslipping zone. The coverslipper device picks the cover slips stacked in a coverslip tray of the slip pick-up zone and moves to the coverslipping zone. The slide pick-up platform positions itself in the coverslipping zone while the picked coverslip is mounted over the slide. The processed cover slipped slide is transported by a slide conveyor and inserted into a slide tray, which is moved up and down and is positioned to accommodate the next processed slide.

In an embodiment, the coverslipper is capable of processing large format slides of sizes 6"×8" and 5"×7" and is adaptable with customized modifications to slides of smaller sizes including 1"×3" and 2"×3". In an embodiment, the slide tray comprises the stack of stained slides that are inserted into evenly spaced grooves, wherein the slide tray is positioned to pick up the designated slide by the slide pick-up platform. In an embodiment, the wedge-shaped nozzle dispenses the mountant medium uniformly over the slide from a container. In an embodiment, the system further comprises a dispenser nozzle park zone. The wedge-shaped nozzle, after dispensing, is rested at a home position, where solvent containers are placed to prevent clogging of nozzle tips, and the wedge-shaped nozzles are partially immersed into solvent containers.

In an embodiment, the system further comprises an actuator that moves linearly at a predefined speed and dispenses the mountant medium on the slide using the wedge-shaped nozzle, and after the dispensing, the actuator retreats to a home position. Therefore, a tip of the wedge-shaped nozzle stays immersed into solvent medium that is contained in a tray to avoid drying of nozzle tip. In an embodiment, the system further comprises a combination algorithm that monitors real time suction pressure in a line that supplies suction force to the vacuum suction cups and facilitates vertical position sensing. The combination algorithm detects the picking-up of the coverslip based on build-up of the suction pressure and once the suction pressure crosses a threshold, a vertical downward motion of the coverslipper device is stopped. In an embodiment, the system further comprises a sensing system that works in communication with the combination algorithm to pick each slide to and to provide feedback to a processor to perform next operation. In an embodiment, a pick and place mechanism of the coverslipper device is controlled by a dedicated algorithm to facilitate accurate and uniform placement, and to prevent and eliminate formation of air bubbles.

In an embodiment, the coverslipper device comprises a vertical plate, a first curved plate, a and a second curved plate. The vertical plate comprises pinion gears that rotate on a shaft connected to one side of the vertical plate. The first curved plate comprises a rack gear on top, where the pinion gear rotates over the rack gear. The second curved plate is attached below the first curved plate, where a set of vacuum suction cups are attached on 4 corners to a lower side of the second curved plate. Rotation of the pinion gear over the rack gear translates the second curved plate along a predefined path, and the vacuum suction cups are detachably attached on the coverslip from a first end to a second end of the coverslip to lift the cover slip. In an embodiment, the predefined path of the second curved plate is achieved by a simultaneous multi-axis motion algorithm that enables a unique locus of motion to prevent occurrence of air pockets and bubbles below the cover slip.

In an embodiment, the rack facilitates an overall movement profile that mimics the human ankle motion between the Dorsiflexion and Plantarflexion positions. In an embodiment, the predefined path of the second curved plate is a rolling motion, which is a combination of movements of the mechanism in all axes, namely, X, Y and theta axis, wherein the combination algorithm facilitates movement along the respective X, Y and theta axis, to result in a user defined locus of motion. In an embodiment, the rack has a curved profile to ensure that the distance between the centre of the pinion gear and end of the vacuum suction cups is always the same regardless of the position of the rack and pinion gears, and wherein points of contact between the coverslip and the slide are at the same level regardless of the orientation of the second curved plate holding the vacuum suction cups.

In an embodiment, regardless of an angle of orientation of the coverslipper device, the points of contact between the coverslip and the slide are at same distance from the centre of the coverslipper device. In an embodiment, the process of coverslipping using the coverslipper comprises to dispense a mountant medium on a slide, position a coverslip using the coverslipper device directly above the slide exactly matching the slide's position, bring the first end of coverslip towards slide and placing on the slide, where starting contact area between coverslip and the slide is less than an empirically determined level to prevent air pockets, roll the coverslipper device towards end of slide to spread the mountant medium all over slide area uniformly, and release the coverslip from the coverslipper device by releasing suction force from the vacuum suction cups.

In an embodiment, the coverslip alignment mechanism is built with a custom designed coverslip tray with an alignment mechanism diagonally mounted for aligning the coverslips during each pickup of the coverslip. The coverslips are stacked in the coverslip tray, wherein the coverslips are made of glass with a smooth surface, which results in the coverslips on stack to tend to slip when a topmost coverslip is picked from the coverslip tray. This causes an edge reference of the coverslip to change and results in laying of the coverslip, and the edge reference of coverslip and the slide are not at same reference, which prevents coverslip breakage and tissue sample being un-used.

In an embodiment, the coverslip tray is in built with coverslip aligners which are connected to linear actuators and controlled by control software. In an embodiment, a process of picking coverslip involves initialising system, which extracts the aligners, enabling the user to load stack of coverslips, initialising system and aligning all the stacked coverslips to ensure that the coverslips are in same reference line, picking of the coverslip, wherein once the topmost coverslip is picked by suction cups, the aligners relax, enabling coverslip to be picked up gently, and after picking, the coverslipper device moves to coverslipping zone, while the aligners retract and aligns/hold the coverslip stack on same reference, wherein cover slips are picked up at the same reference point.

In an embodiment, the system further comprises an electromechanical control system comprises a data acquisition device (DAQ) that acquires data from different sensors and generate control signals for driving motors and controlling pneumatic systems. The motors, sensors, and pneumatic systems from each zone of the system are controlled by a single, central DAQ device which requires very high processing power and communication bandwidth. The motors, the sensors, and the pneumatic systems are physically connected to the DAQ device to reduce complexity in cable routing and to increase overall system footprint. In an embodiment, the system further comprises a distributed intelligence system that comprises the dedicated DAQ device for each zone, where the DAQ device is programmed specifically to perform functions intended for a specific zone that is selected from one of the input zone, the output zone, the coverslipping zone, the slider conveyer, the slip pick-up zone, and the dispensation zone.

The coverslipper disclosed herein addresses the need for an improved coverslipping and dispensing technique that ensures uniform distribution of mountant medium thus ensuring zero or minimal in-significant air gaps. The coverslipper is designed to handle large format slides, for example, 150×200 mm, since the current practice of analysing slides is limited to small sizes, typically 25×75 mm thus incompatible to analyse larger tissues such as human or large animal brains and other organ tissues. As the current slides processed are smaller in sizes, only small size coverslips matching those slides are internally transported and processed by currently available coverslippers in market. The coverslipper disclosed herein is capable of internally transporting and processing cover slips compatible to and dimensionally suiting the large format slides. Furthermore, the coverslipper has compatibility to process small, medium, and large format slides with an adaptive/retrofit coverslipper device. The formats process small format slides only and cannot be programmed/modified/customized to suit other sizes. This coverslipper provides possibilities to customize the relevant critical components of the system to suit small, medium, and large format slides.

This coverslipper uses a unique pickup technique. The large format coverslip is of maximum dimension of 150×200 mm with thickness of 0.1-0.2 mm, which is large and is made up of thin glass, which is brittle and difficult to handle manually for coverslipping. Several such slides are stacked in a coverslip tray amongst which the topmost coverslip shall be picked by a picker assembly. If not handled properly, the picking up of the coverslip could result in multiple slips picked up together or breakage of the coverslips. To facilitate a smooth and firm picking of single coverslip from the tray, a custom-made centre pivoted picker plate is designed with multiple double bellow vacuum suction cups positioned at strategic places. The double bellow vacuum suction cups are used specifically to have a cushion effect during picking up of the coverslip with minimal impact that ensures the coverslip is intact while picking.

The vacuum suction cups are provided with an optimal suction pressure to create a smooth picking action, hence preventing any breakage of coverslip. The picker plate is pivoted to a mechanism with axis motors which, in turn, provides a rolling motion for picking. With this rolling motion, the coverslip is picked from one end (with front end vacuum suction cups), followed by a rolling motion, the tail end of coverslip also is picked. Due to this technique of picking, it is empirically and experimentally verified that only an individual topmost coverslip is picked up safely.

BRIEF DESCRIPTION OF THE ACCOMPANYING DRAWINGS

The following drawings are illustrative of examples for enabling systems and methods of the present disclosure, are descriptive of some of the methods and mechanism, and are not intended to limit the scope of the invention. The drawings are not to scale (unless so stated) and are intended for use in conjunction with the explanations in the following detailed description.

FIG. 18 shows a schematic drawing that illustrates a distributed intelligence system associated with the system architecture of the coverslipper device, as an example embodiment of the present disclosure.

DETAILED DESCRIPTION

Figure 1A:
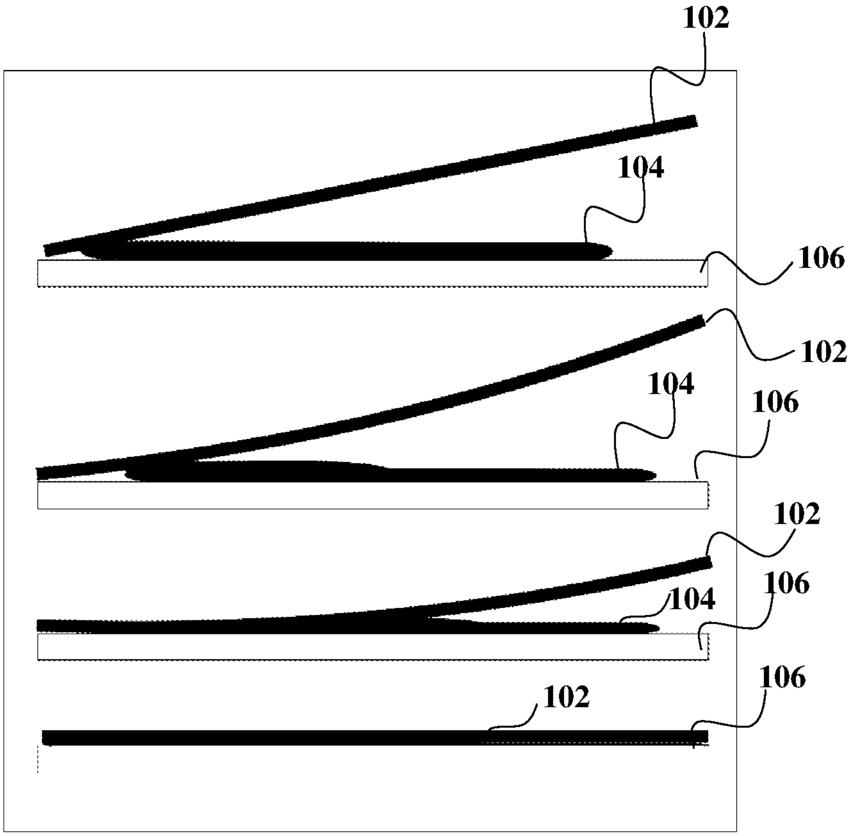
FIG. 1A shows a unique placement mechanism in association with the coverslipper as disclosed, as an example embodiment in the present disclosure.

Exemplary embodiments now will be described. The disclosure may, however, be embodied in many different forms and should not be construed as limited to the embodiments set forth herein; rather, these embodiments are provided so that this disclosure will be thorough and complete, and will fully convey its scope to those skilled in the art. The terminology used in the detailed description of the exemplary embodiments illustrated in the accompanying drawings is not intended to be limiting. In the drawings, like numbers refer to like elements.

Figure 1B:
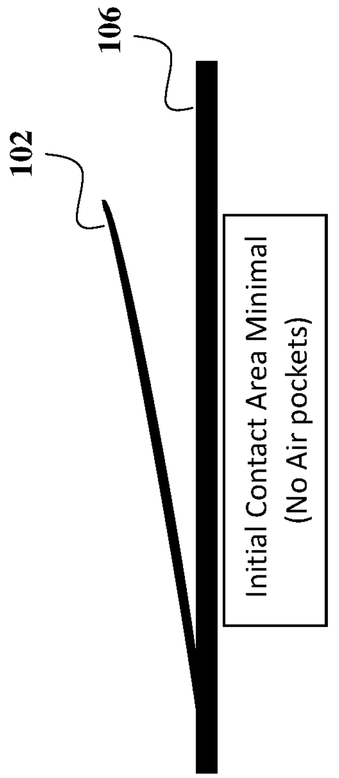
FIG. 1B shows the coverslipper in action as shown in FIG. 1A, where initial contact area is minimal for avoiding air pockets, as an example embodiment in the present disclosure.
Figure 1C:
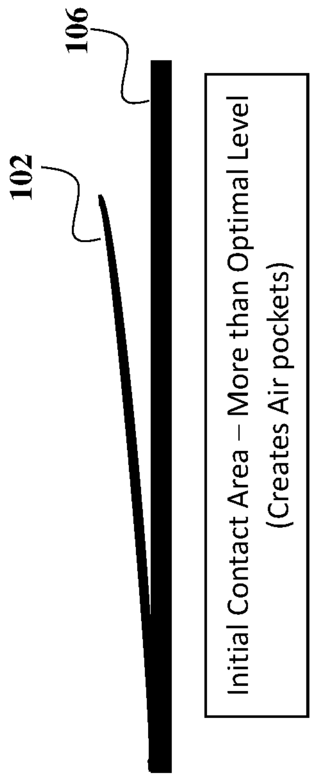
FIG. 1C shows the coverslipper in action as shown in FIG. 1A, where initial contact area is more than optimal level, which creates air pockets, as an example embodiment in the present disclosure.

FIGS. 1A-1C show a unique placement mechanism in association with the coverslipper device 200 as disclosed as an example embodiment in the present disclosure. The coverslipping process using the coverslipper device 200 involves the steps described below, to achieve a bubble-free coverslipping. In a step 1: The mountant medium 104 is dispensed on slide 106. Step 2 involves positioning of coverslip 102 directly above the slide 106 exactly matching the slide's 106 position. Step 3 involves bringing the start end of coverslip 102 towards slide 106 and place on slide 106. Step 4 involves ensuring that the starting contact area between coverslip 102 and slide 106 is less than empirically determined level to prevent air pockets, as illustrated in FIGS. 1B and 1C. Step 5 involves rolling on the coverslipper mechanism towards end of slide 106 in such a way that this action spreads the mountant medium 104 all over the slide area till end of slide 106, uniformly. Finally step 6 involves releasing the coverslip 102.

Figure 2A:
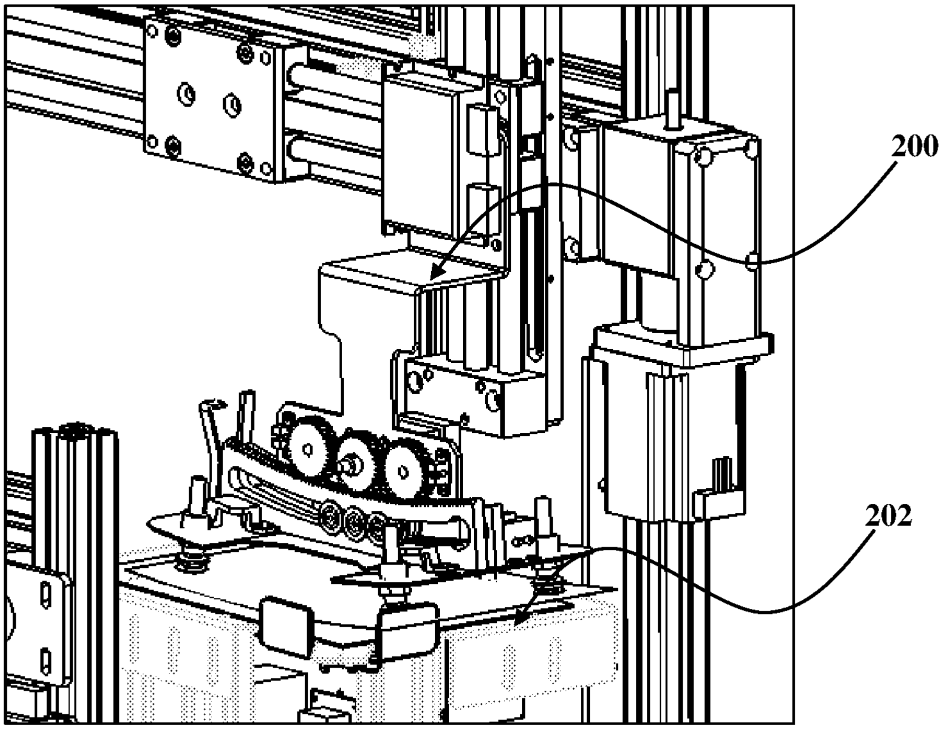
FIGS. 2A-2D show how the coverslipper disclosed here implements a unique curved rack and pinion mechanism exhibiting unique motion characteristics, as an example embodiment in the present disclosure.
Figure 2B:
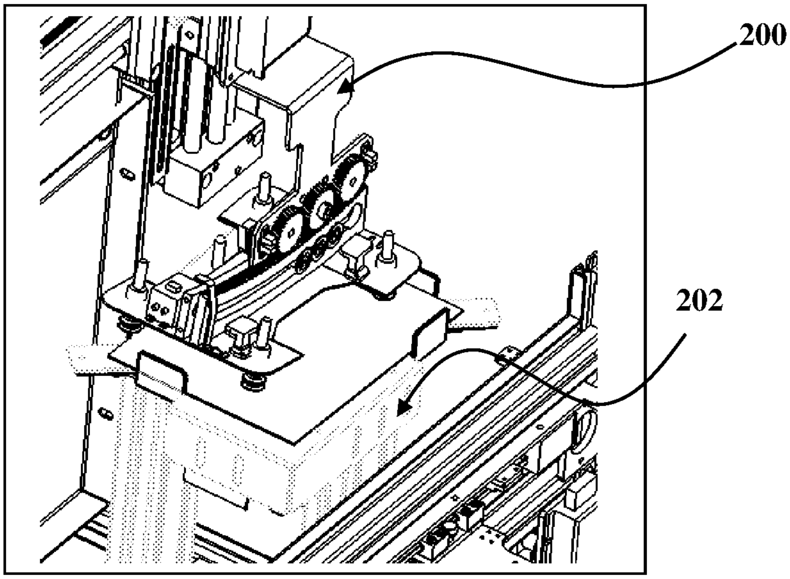
Figure 6A:
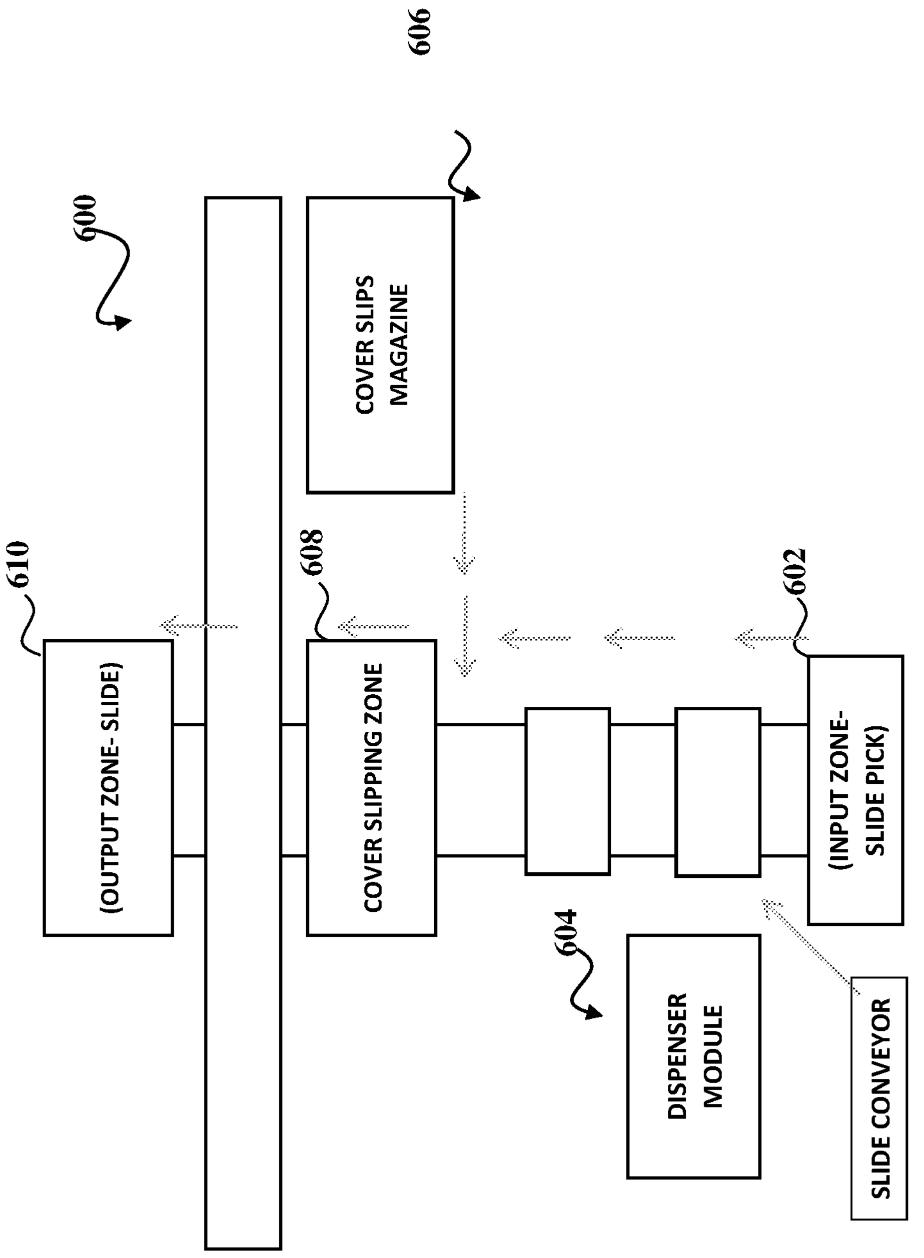
FIGS. 6A and 6B show the system architecture associated with the coverslipper that's included in the system that also defines a set of zones, as an example embodiment in the present disclosure.
Figure 6B:
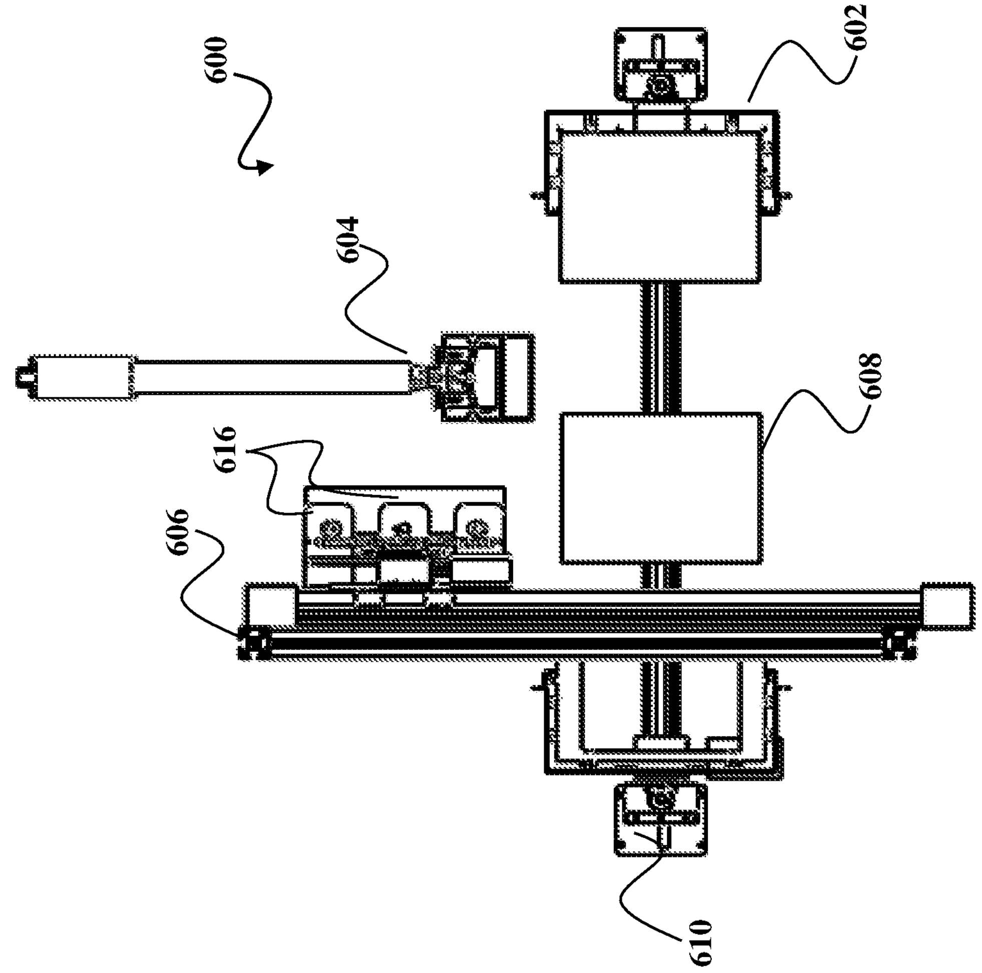

Based on the FIG. 1A, and as shown in FIGS. 2A and 2B, a novel rolling motion mechanism is implemented to facilitate and perform automation of the below mentioned procedure of coverslipping. In a step 1, the coverslip 102 is picked up gently from the coverslip tray 202. In a step 2, the picked coverslip 102 is moved into the coverslipping zone 608, as shown in FIGS. 6A and 6B. In a step 3, the coverslip 102 is positioned above the slide 106 and coverslipping is performed. The rolling motion mechanism deploys a three-axis motion mechanism with the functions, namely, X-axis Motion, Y-axis motion, and Rolling motion mechanism to facilitate coverslipping. Based on software analysis of the motion pattern required for the above coverslipping technique, the locus of motion is deduced, and an algorithm is used for the same. This algorithm controls and defines the movements of each individual axis and synchronized operation of all the axes.

Figure 2C:
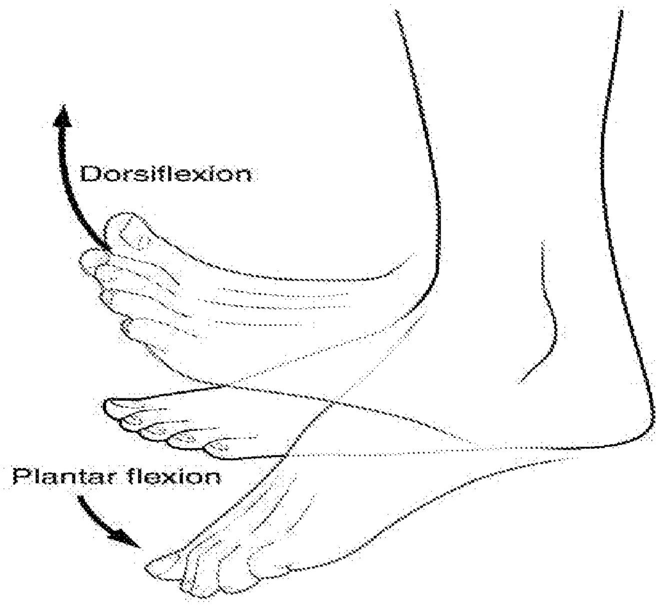
Figure 2D:
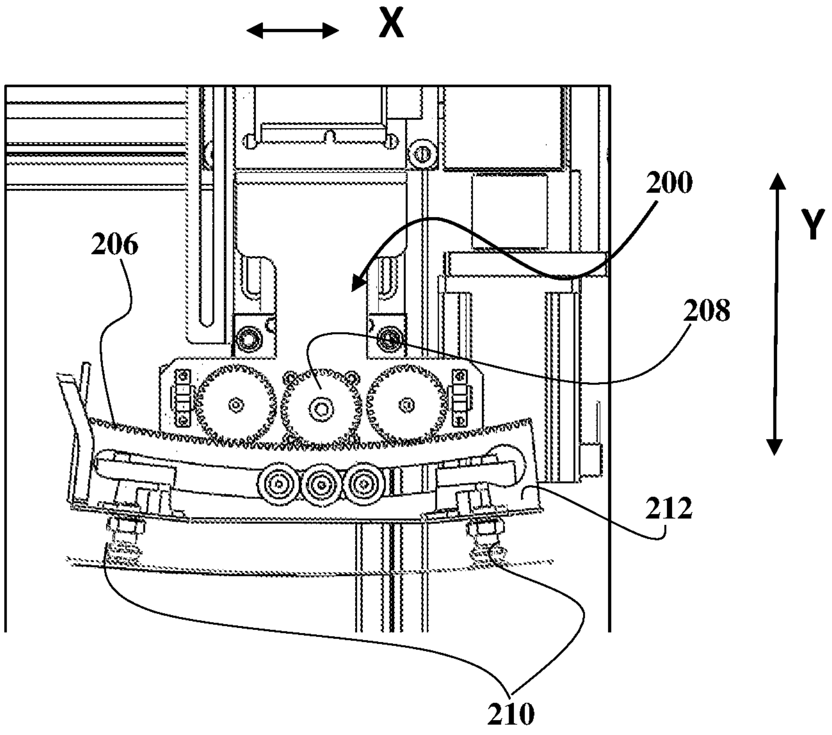

FIGS. 2A-2E shows how the coverslipper device 200 disclosed here implements a unique curved rack 206 and pinion 208 mechanism (as described further in FIGS. 2D, 2E and 3), exhibiting unique motion characteristics. Here, FIGS. 2A and 2B shows axis of motion along the construction of the coverslipper device 200. The core mechanism contains a rack 206 and pinion 208 arrangement. As shown in FIG. 2C, the rack 206 facilitates an overall movement profile that mimics the human ankle motion between the Dorsiflexion and Plantarflexion positions. The core mechanism also contains vacuum suction cups 210 that are attached below the arrangement of rack 206 and pinion 208 for picking up of the coverslip 102. However, as shown in FIG. 2D, the rack 206 has a curved profile to ensure the distance between the centre of the pinion 208 wheel and the end of the vacuum suction cups 210 is always the same regardless of the position of the rack 206 and pinion 208 motion. This means that the points of contact between the coverslip 102 and the slide 106 will be at the same level regardless of the orientation of the plate 212 holding the vacuum suction cups 210. Regardless of the angle of orientation of the coverslipper device 200 mechanism, the point of contact is at the same distance from the centre of the pinion 208. This methodology ensures a smooth laying of coverslip 102 from one end of the slide 106 to another with optimal uniform pressure just enough to bond the coverslip 102 and the slide 106.

Figure 2E:
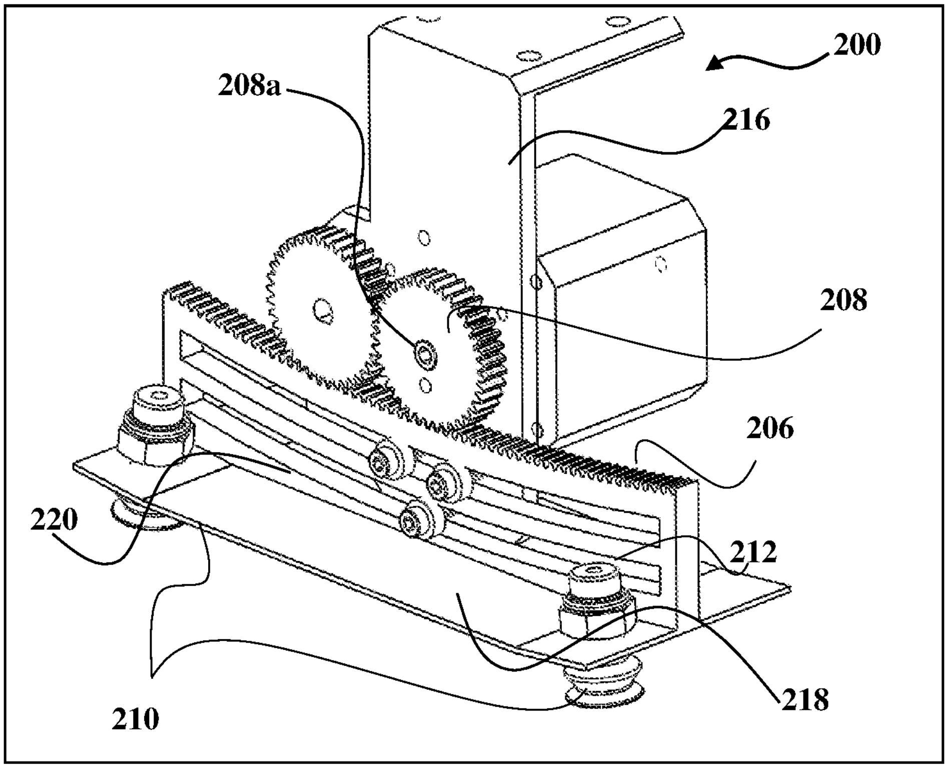
FIG. 2E shows the 2×3 coverslipper picker mechanism implements a unique curved rack and pinion mechanism exhibiting unique motion characteristics as an example embodiment in the present disclosure.
Figure 3:
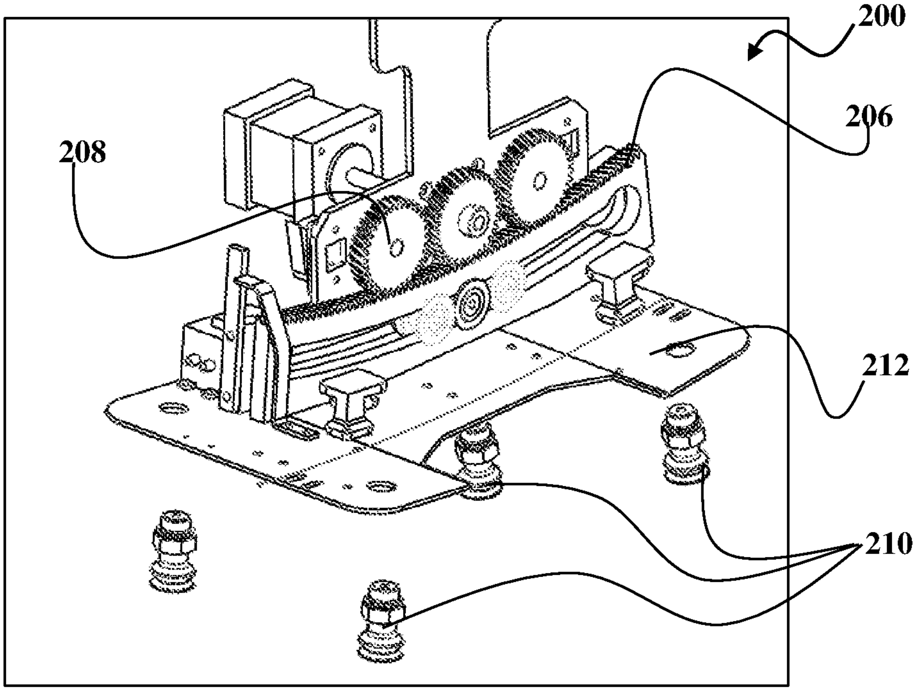
FIG. 3 shows how the coverslipper disclosed here uses a simultaneous multi-axis motion algorithm that enables a unique locus of motion, to ensure prevention of occurrence of air pockets and bubbles as an example embodiment in the present disclosure.

In other words, as shown in FIGS. 2D-3 and with emphasis on FIG. 2E, the coverslipper device 200 comprises a vertical plate 216, a first curved plate 218, a and a second curved plate 220. The vertical plate 216 comprises the pinion gear 208 that rotates on a shaft 208*a* connected to one side of the vertical plate 216. The first curved plate 218 comprises a rack gear 206 on top, where the pinion gear 208 rotates over the rack gear 208. The second curved plate 220 is attached below the first curved plate 218, where a set of vacuum suction cups 210 are attached to a lower side of the second curved plate 220. Rotation of the pinion gear 208 over the rack gear 206 translates the second curved plate 220 along a predefined path, and the vacuum suction cups 210 are detachably attached on the coverslip 102 from a first end 102*a* to a second end 102*b*, as shown in FIG. 2D, of the coverslip 102 to lift the coverslip 102.

FIG. 3 shows how the coverslipper device 200 disclosed here uses a simultaneous multi-axis motion algorithm that enables a unique locus of motion, to ensure prevention of occurrence of air pockets and bubbles. As also shown in FIG. 2C, the above rolling motion mechanism using the coverslipper 200 mimics a human ankle motion. This rolling motion (as in FIG. 3) is a combination of movements of the mechanism in all the axes, namely, X, Y and theta axis. A unique algorithm ensures accurate movement of respective axes, to result in a unique locus of motion as per the below figures and calculations. Here, FIG. 2D shows the distances of the central and extreme end vacuum suction cups 210 from the centre of the pinion 208. The angle between the lines connecting the centre to the vacuum suction cups (A and B) is θ. Based on analysis, the horizontal and vertical distance of travel of the mechanism (X and Y respectively), are determined. Based on calculation, the speed and various synchronous timelines of motion are calculated, and the actions are performed. Accordingly, resulting motor speed for each axis is estimated to attain rolling motion.

Figure 4:
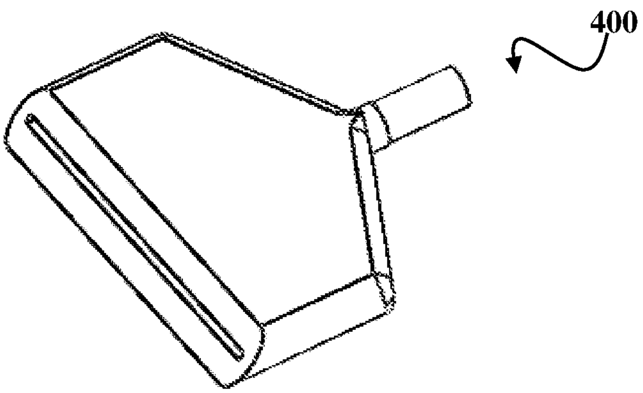
FIG. 4 shows a medium dispensing nozzle design that is used in the coverslipper mechanism, wherein the nozzle design is used for mounting to suit large format processing, as an example embodiment in the present disclosure.

FIG. 4 shows a mounting medium dispensing nozzle design 400 that is used in the coverslipper device 200 mechanism, wherein the nozzle design 400 is used for mounting to suit large format processing. While handling smaller slides 106, a single nozzle based dispensing system ensures uniform dispensation. This coverslipper device 200 mechanism deploys a wedge-shaped dispensation system 400 to dispense suitable empirically evaluated mountant medium application patterns. These patterns ensure zero or minimal air bubbles and absence of air-pockets.

FIGS. 5A-5F show how multiple patterns 500*a*-500*c* using the medium dispensing nozzle design 400 of mountant medium 104 for improved coverage. Optimal, customized dispensing pattern of mountant medium 104 plays a major role in achieving: 1. Bubble free coverslipping, 2. Uniform distribution of mountant medium 104 all over the slide area, 3. Covering up the tissue (on slide 106) without any air pockets. Combinations of various dispensing patterns and different mountant medium 104 volumes were experimentally studied and characterized. Amount of mountant medium 104 to be used is derived by practical application study and optimal volume of mountant medium 104 per coverslipping operation is determined. Based on trials, three specific dispensation patterns are found to be successful as shown in FIGS. 5A-5F.

Figure 5A:
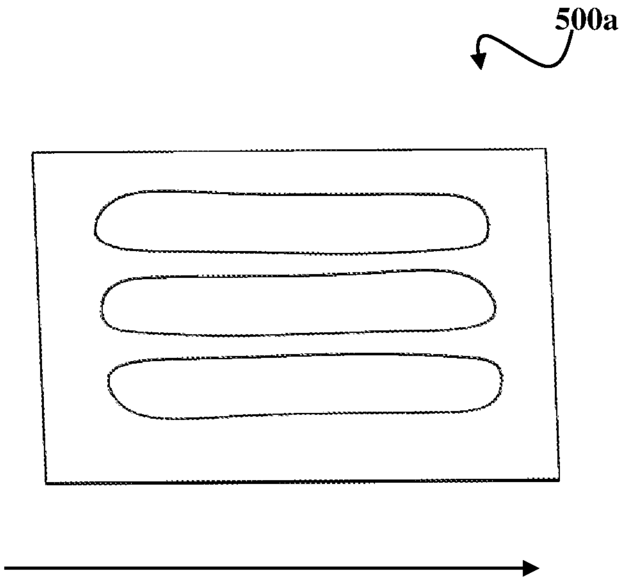
FIGS. 5A-5F show how multiple patterns using the medium dispensing nozzle design of mountant medium for improved coverage, as an example embodiment in the present disclosure.
Figure 5B:
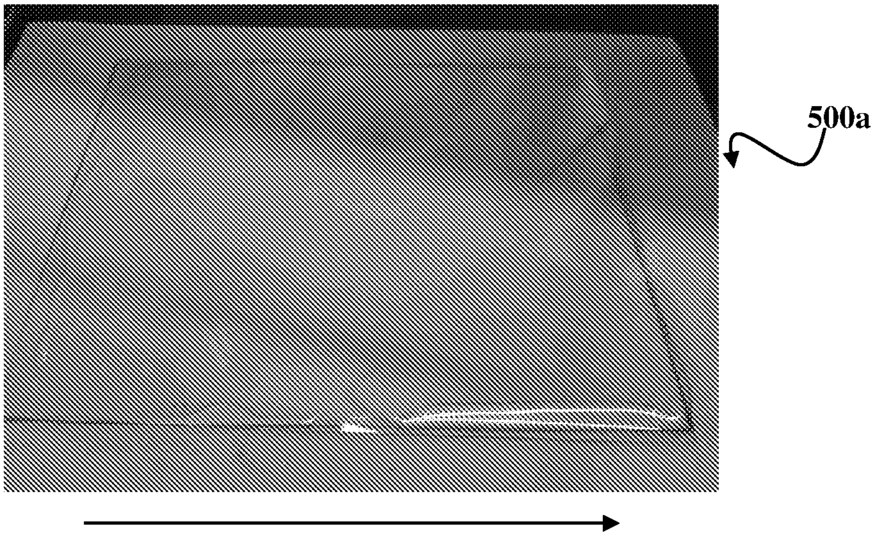
Figure 5C:
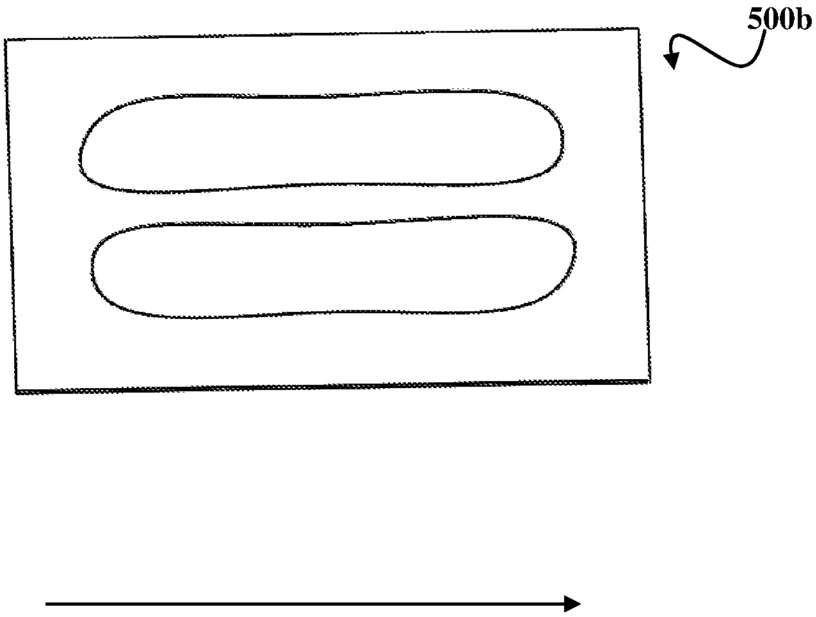
Figure 5D:
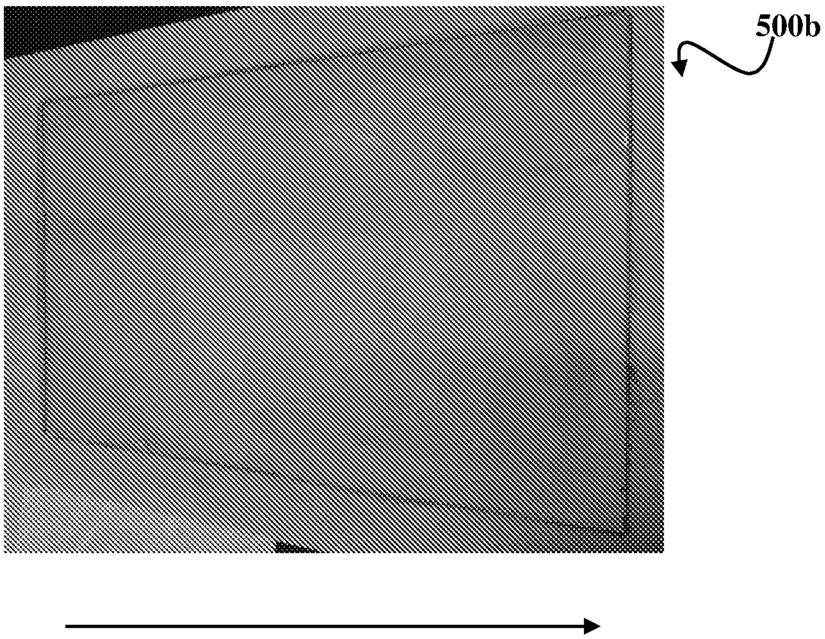
Figure 5E:
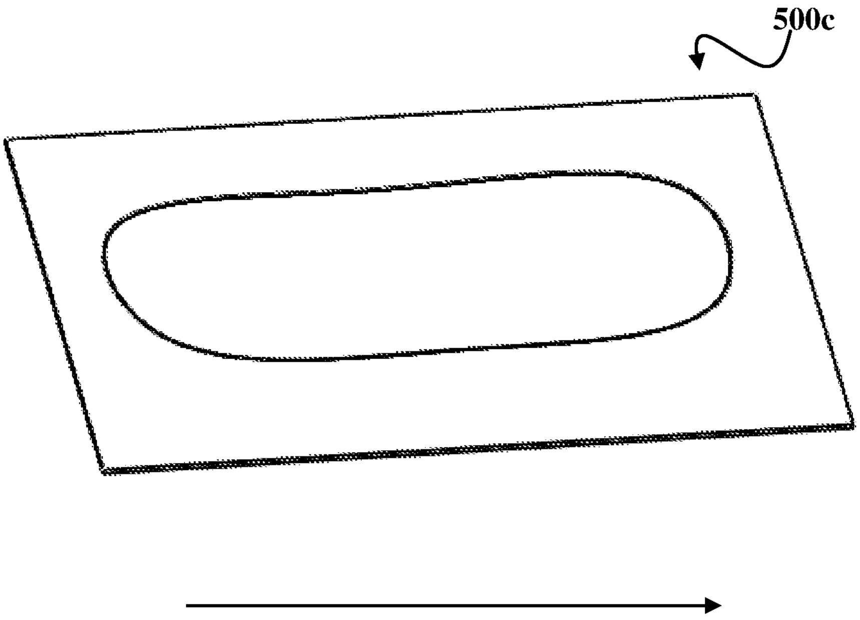
Figure 5F:
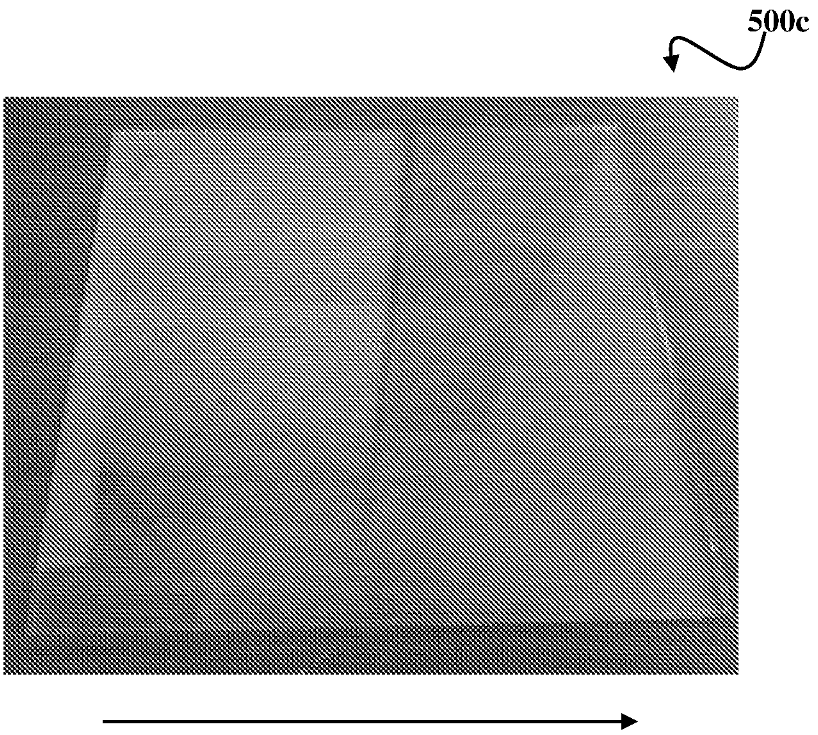

FIGS. 5A and 5B show a triple equidistant pattern 500*a*, wherein three bands of mountant medium 104 are dispensed in parallel to the axis of coverslipping. FIG. 5A shows 3 stripes of mountant medium 104 and FIG. 5B shows output after coverslipping with no air bubbles. FIGS. 5C and 5D show a dual equidistant pattern 500*b*, where two wider bands of mountant medium 104 were dispensed in parallel to the axis of coverslipping with a wedge-shaped nozzle 400. FIG. 5C shows 2 stripes of mountant medium 104 and FIG. 5D shows output after coverslipping with no air bubbles. FIGS. 5E and 5F show a single dispense pattern 500*c*, where a single wide band of mountant medium 104 is dispensed in the centre of slide 106 in parallel to the axis of coverslipping with a wedge-shaped nozzle 400. FIG. 5E shows 1 stripe mountant medium 104 and FIG. 5F shows the output after coverslipping with no air bubbles. The bubble free coverslipping is achieved by coverslipping function, with all the above three types of dispense patterns.

Figure 6C:
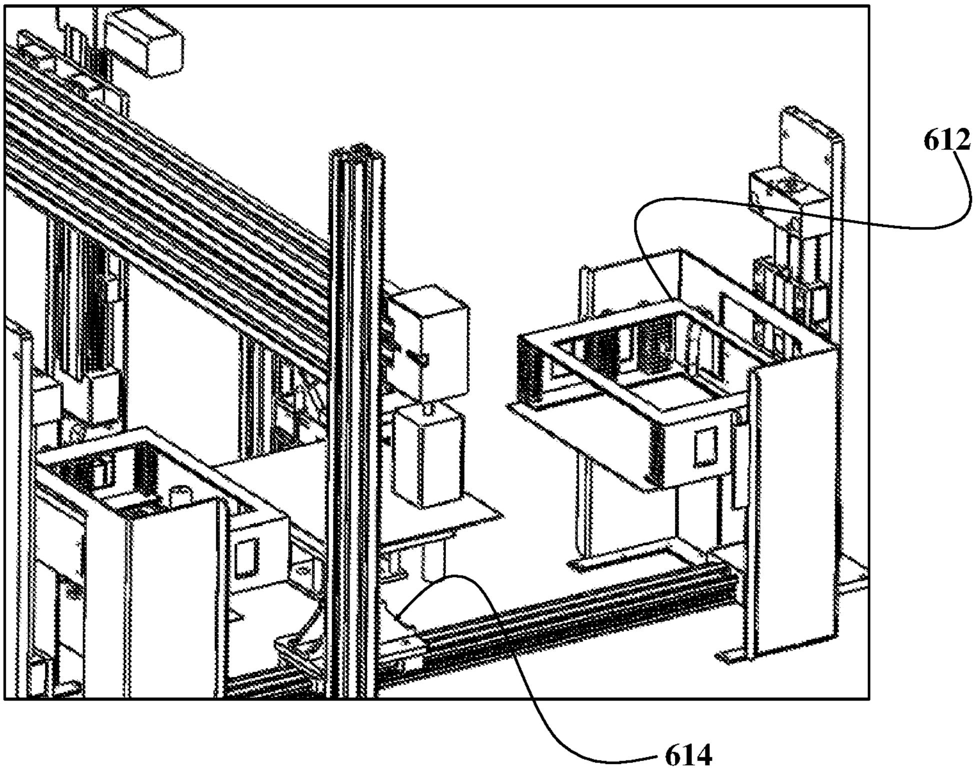
FIGS. 6C-6F show the different zones comprised within the coverslipper system, as an example embodiment in the present disclosure.
Figure 6D:
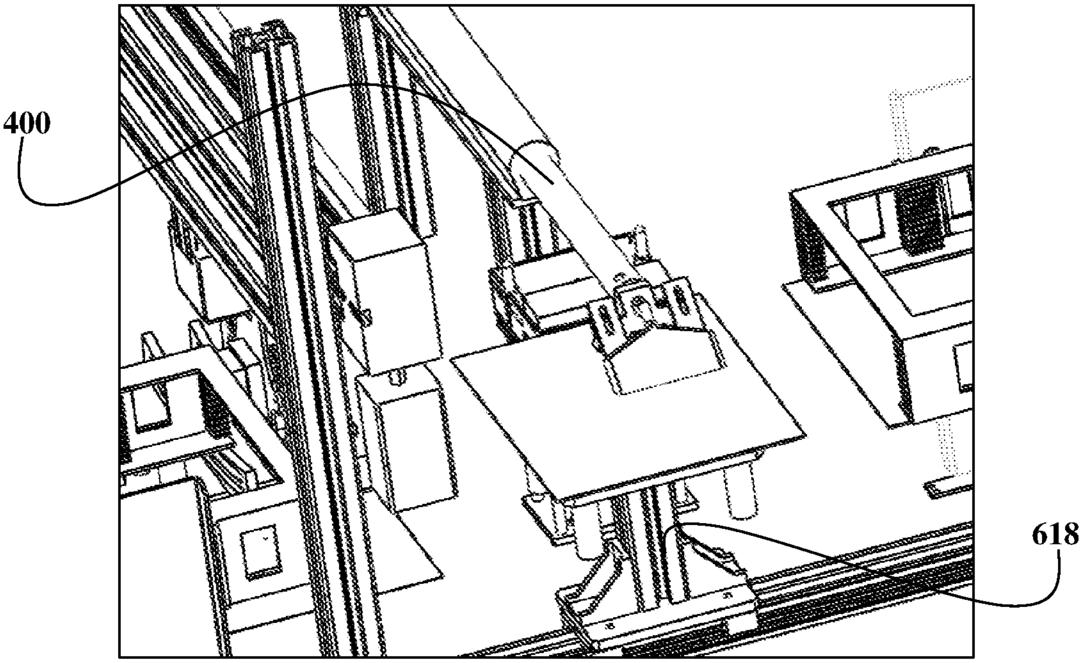
Figure 6E:
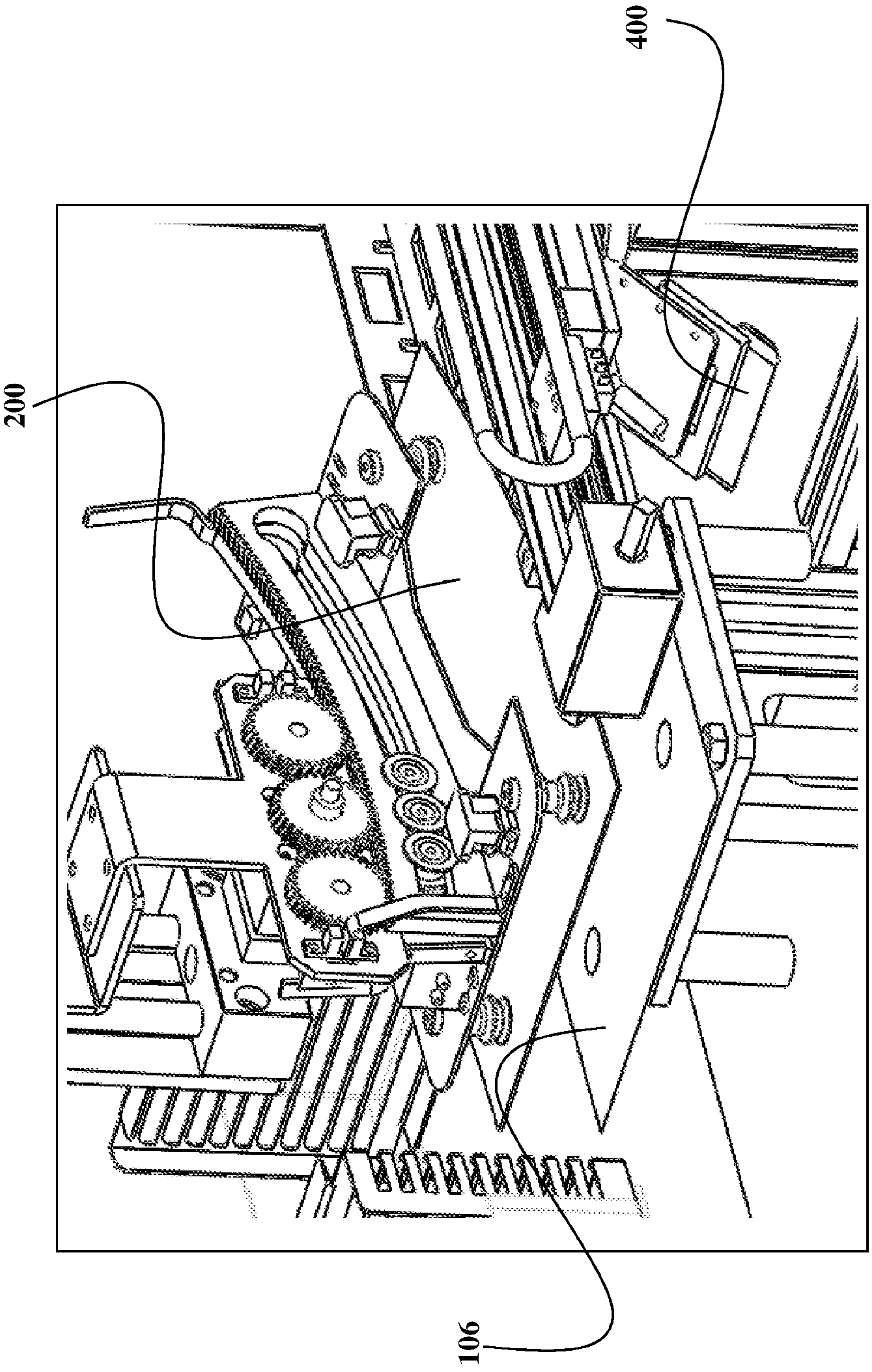
Figure 6F:
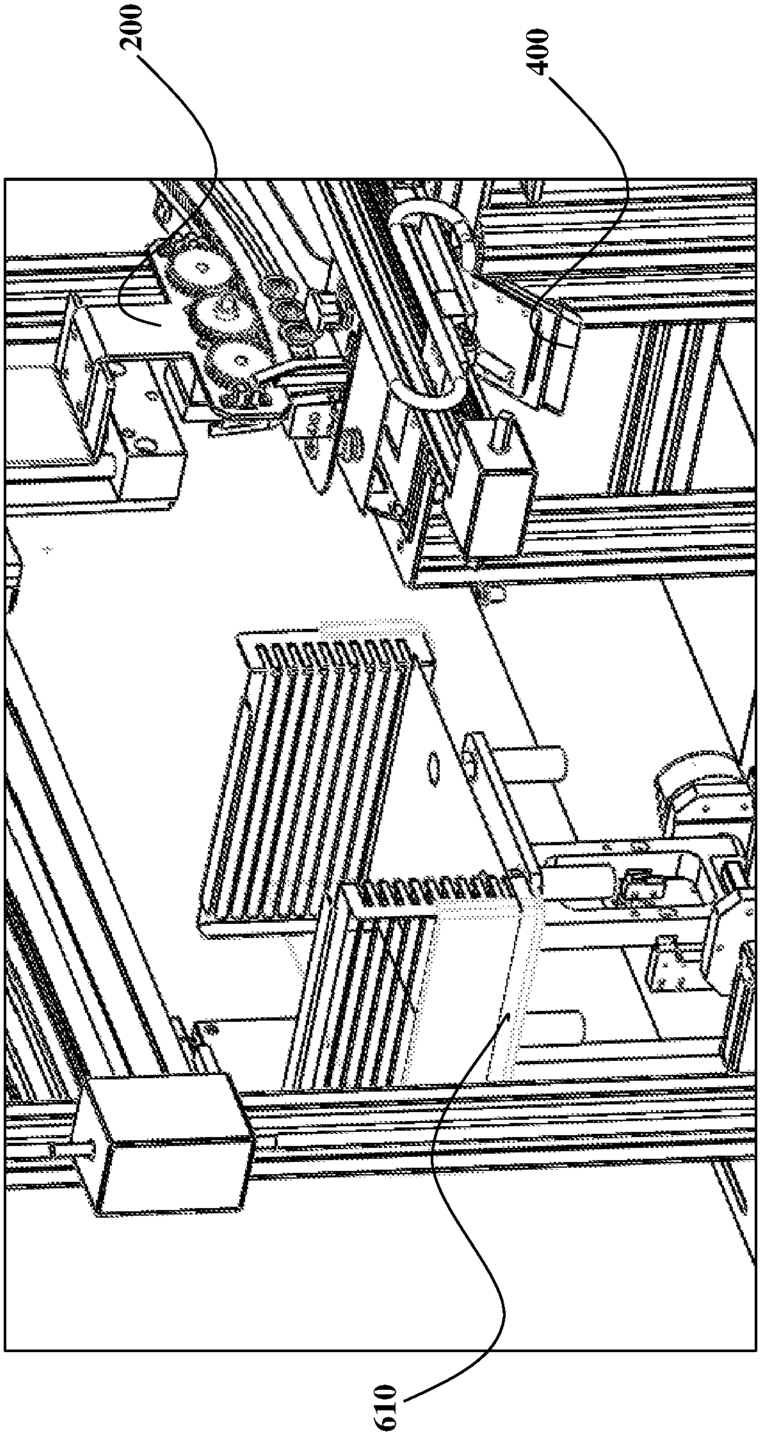

FIGS. 6A and 6B show the system architecture associated with the coverslipper device 200 that's included in the system 600 that also defines a set of zones. This system 600 related to the coverslipper device 200 describes unique designated zones for each sub-process and ensures seamless processing. The system 600 design is divided into the following six zones based on the activity performed in each. FIGS. 6C-6F show the different zones comprised within the coverslipper system 600. About the input zone 602, this zone has provisions for holding a slide tray 612 as shown in FIG. 6C. The slide tray 612 contains a stack of stained slides 106 inserted into evenly spaced grooves. The slide tray 612 is vertically moved up and down to position the slide 106 currently waiting to be picked up. The slide 106 is picked up by the arrangement of vacuum suction cups 210 on the slide pick-up platform and the slides 106 are picked up from bottom to top.

Figure 12:
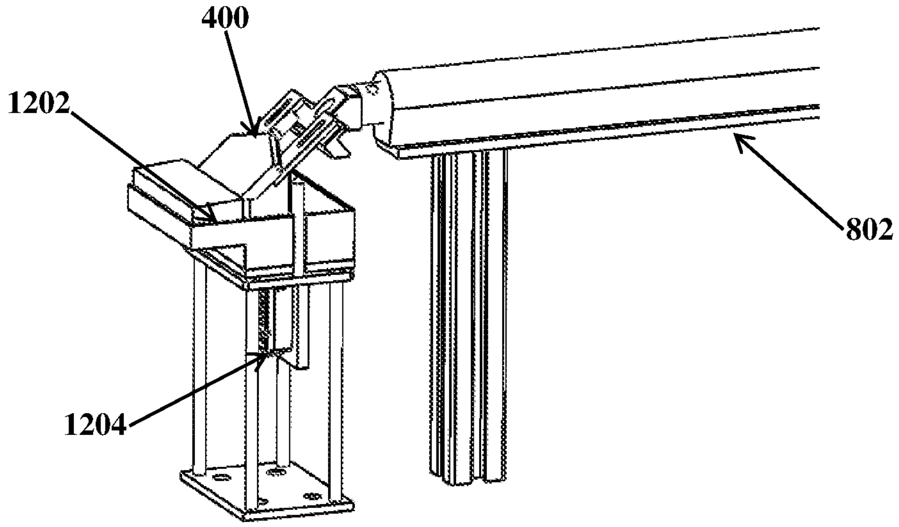
FIG. 12 shows working of the wedge-shaped nozzle of the coverslipper, as an example embodiment of the present disclosure.

About the dispensation zone 604, once the slide pick-up platform reaches this dispensation zone 604, the mountant medium 104 is dispensed through wedge shaped nozzle 400 which performs a uniform mountant medium dispensing from container. About the dispenser nozzle park zone, after dispensing, the dispenser nozzle 400 is returned to home position, where solvent containers 1202 and 1204 are placed to prevent clogging of nozzle tips, the nozzles 400 are partially immersed into solvent containers 1202 and 1204, as shown in FIG. 12. About the slip pick-up zone 606, the coverslip pick and place mechanism picks the coverslips 102 stacked in the coverslip tray 616, as shown in FIG. 6B. About the slip placement zone or the coverslipping zone 608, the slide pick-up platform positions itself in this coverslipping zone 608 while the dispenser nozzle manifold positions, applies and mounts the coverslip 102 over the slide 106. The coverslip 102 pick and place mechanism is controlled by a dedicated algorithm to achieve accurate placement, uniform placement and, prevention and elimination of air bubbles. About the output zone 610, the processed cover slipped slide 106 is transported by the slide conveyor 618 and inserted into a slide tray 612. The slide tray 612 is moved up and is positioned to accommodate the next processed slide 106.

Figure 7:
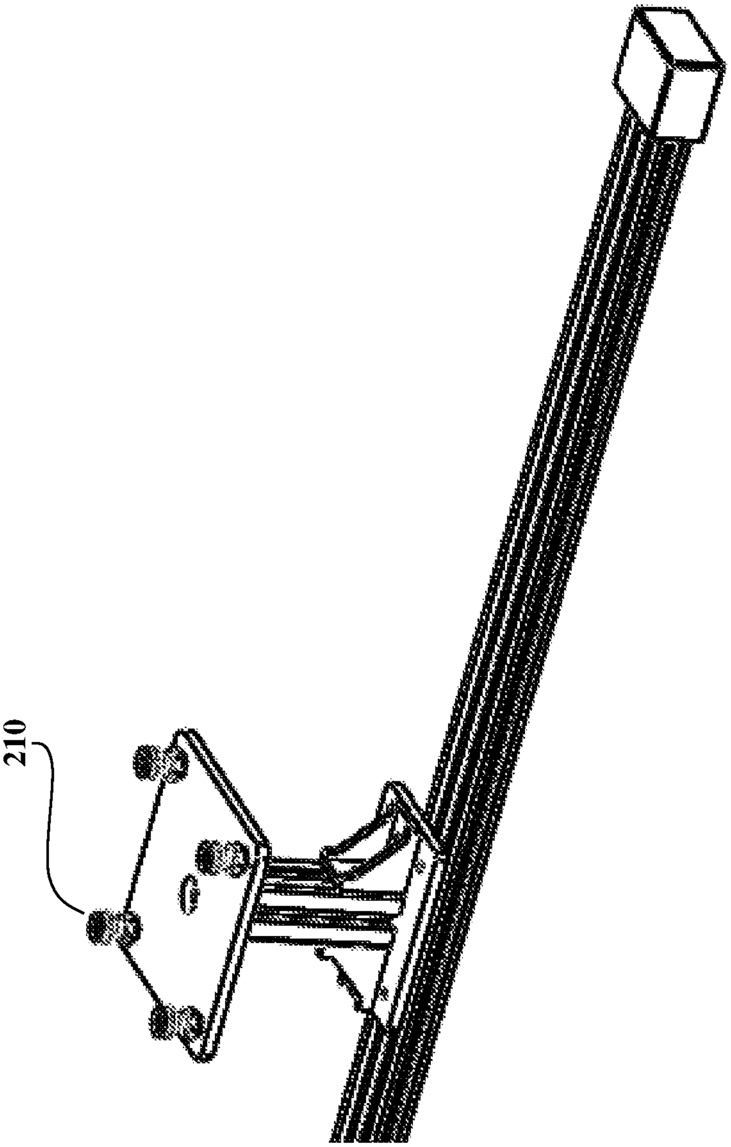
FIG. 7 shows a vacuum suction-cup based slide pick-up mechanism associated with the coverslipper, as an example embodiment of the present disclosure.

FIG. 7 shows a vacuum suction cup 210 based slide pick-up mechanism associated with the coverslipper device 200, as an example embodiment of the present disclosure. Owing to the large size of the slides 106, picking up slides 106 from the input slide tray 612 needs to be done carefully to protect the slide 106 and the tissue on it. This invention uses a unique vacuum suction cup 210 mechanism that holds and picks the slide 106 from the input slide tray 612. The key differentiation is that the slide 106 is held by the vacuum suction cup 210 in the bottom (opposite to where the tissue is present). Unlike other commercial products, where the slides 106 are picked up by gripping mechanism which may have impact on the edges of the slides 106, this unique vacuum suction cup 210 arrangement ensures safe handling of the slide 106, despite the size. The above module comprises of slide conveyor 1014 (linear motion system) with 4 vacuum suction cups 210 placed upside down for slide transporting to each zone.

Figure 8A:
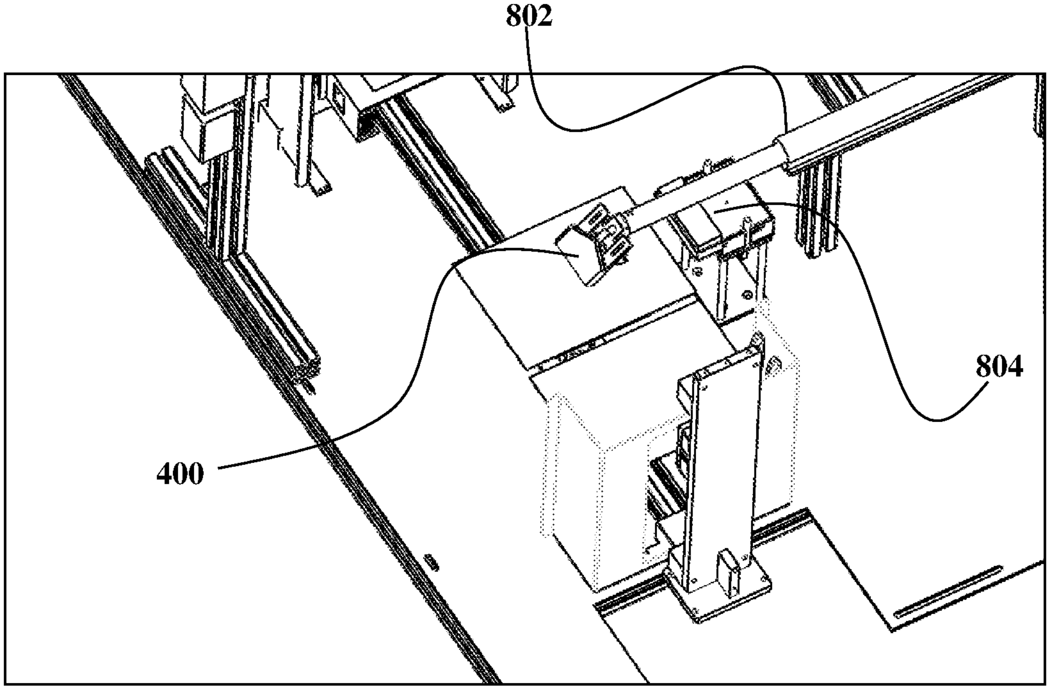
FIGS. 8A and 8B show unique mountant dispensing mechanism, as disclosed herein as an example embodiment in the present disclosure.
Figure 8B:
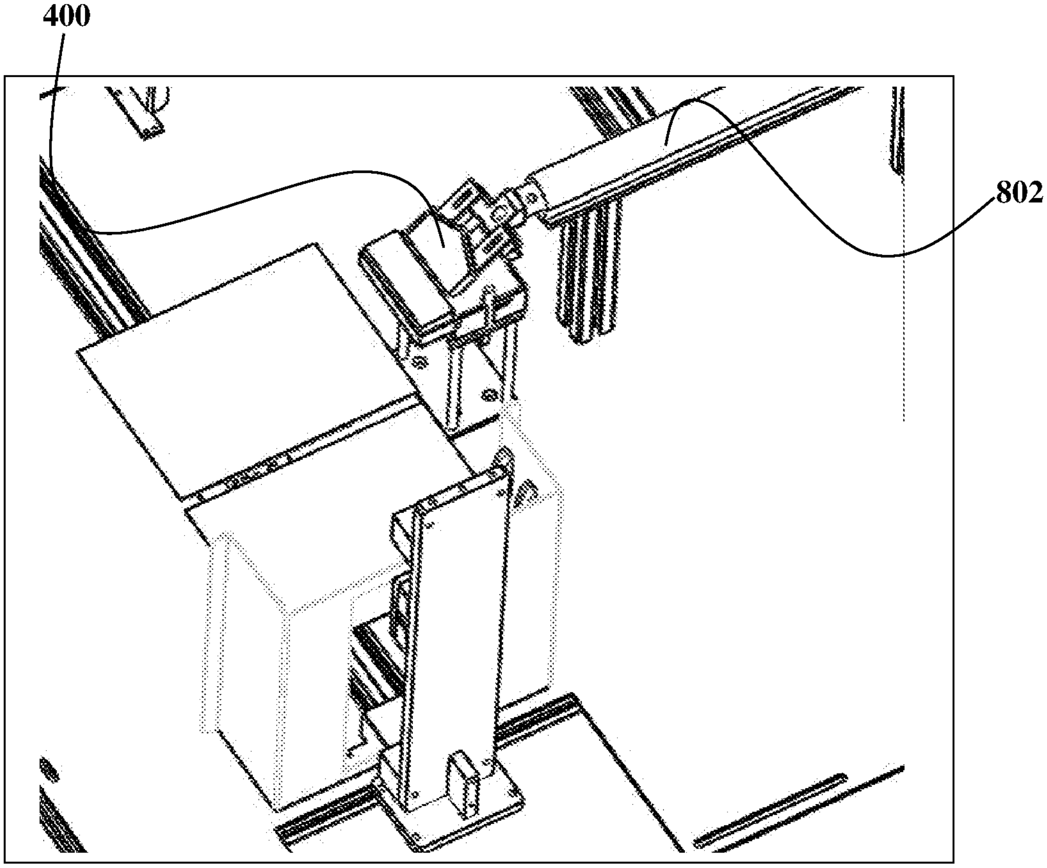

FIGS. 8A and 8B show unique mountant dispensing mechanism, as an example embodiment of the present disclosure. Dispensing mountant medium 104 uniformly across the length and breadth of the coverslip 102 is important as irregular dispensing can cause 1). Air pockets, and 2). Over spillage of mountant medium 104 beyond slide extremities. To overcome above issues and to have a uniform distribution of mountant medium 104, the following mechanism is designed, and the process is as follows: a) Slide 106 entering dispense zone. During this time dispense nozzle 400 will be in home position (mountant medium compatible solution tray 804), b) Slide 106 enters dispense zone. Now actuator 802 moves linearly at a defined speed and dispenses mountant medium 104 on the slide 106, and c) After dispensing, the actuator 802 retreats back to home position, where the wedge-shaped nozzle 400 tip stays immersed into a mountant medium 104 compatible solution present in a solution tray 804 (to avoid drying of nozzle 400 tip).

Figure 9:
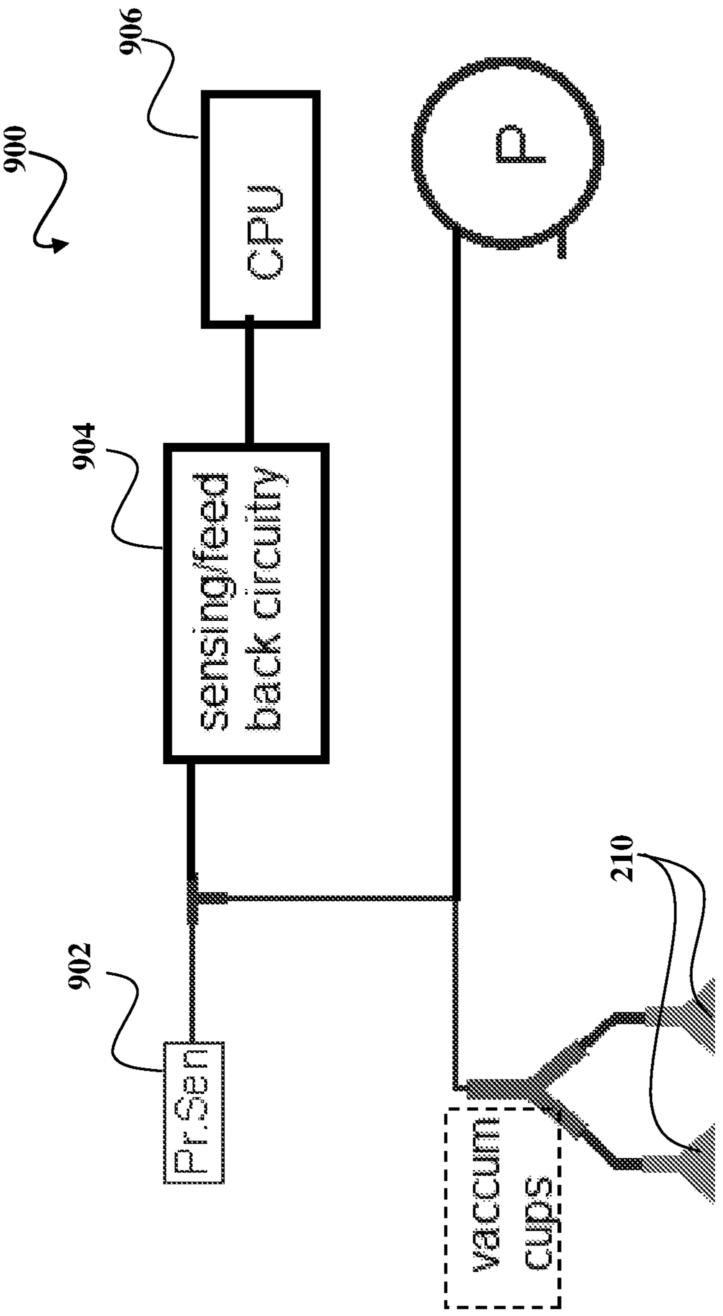
FIG. 9 shows schematic of a sensing and control algorithm and related electronic sensing sub-systems associated with the coverslipper, as disclosed herein as an example embodiment.

FIG. 9 shows schematic of sensing, and control algorithm and related electronic sensing sub-systems 900 associated with the coverslipper device 200, as an example embodiment of the present disclosure. The sensing, and control algorithm and related electronic sensing sub-system 900 includes a pressure sensor 902, a sensing and feedback circuitry 904, and a CPU 906. Repeated one-by-one pick up of coverslips 102 from the coverslip tray 202 requires an accurate vertical motion and needs a precise sensing of the position. As the coverslip 102 is very thin (around 0.17 mm), the sensing must be in real-time. In the longer run, it may not be practical, if the mechanism needs repeated periodic calibration. To overcome this issue, a combination algorithm monitors real time suction pressure in the line that supplies the vacuum suction cups 210 along with the vertical position sensing. This algorithm detects the pick-up of coverslip 102 based on the suction pressure build up and once the suction pressure crosses the thresholds, stops further vertical downward motion. This sensing system 900 is used in slide conveying system to pick each slide to ensure that the slides 106 are picked up and information is shared as a feedback via the sensing and feedback circuitry 904 to the control system to perform next operation.

Figure 10A:
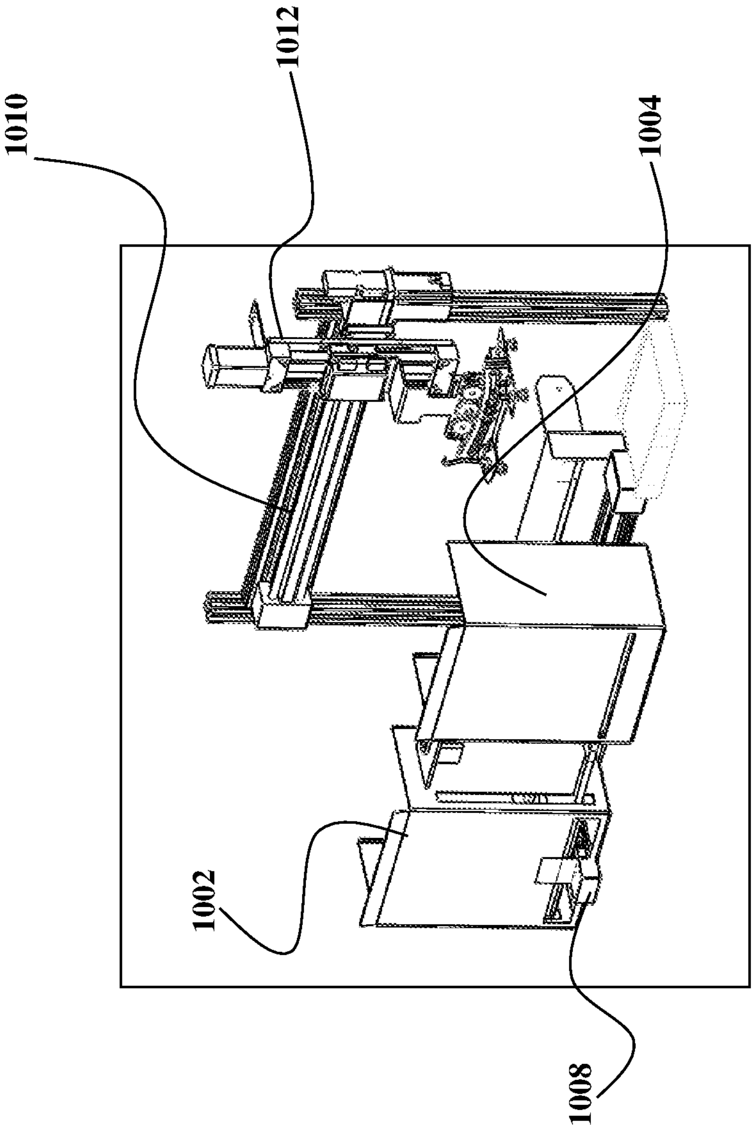
FIGS. 10A-10C show a unique slide transport system that is associated with the coverslipper, as disclosed herein as an example embodiment.
Figure 10B:
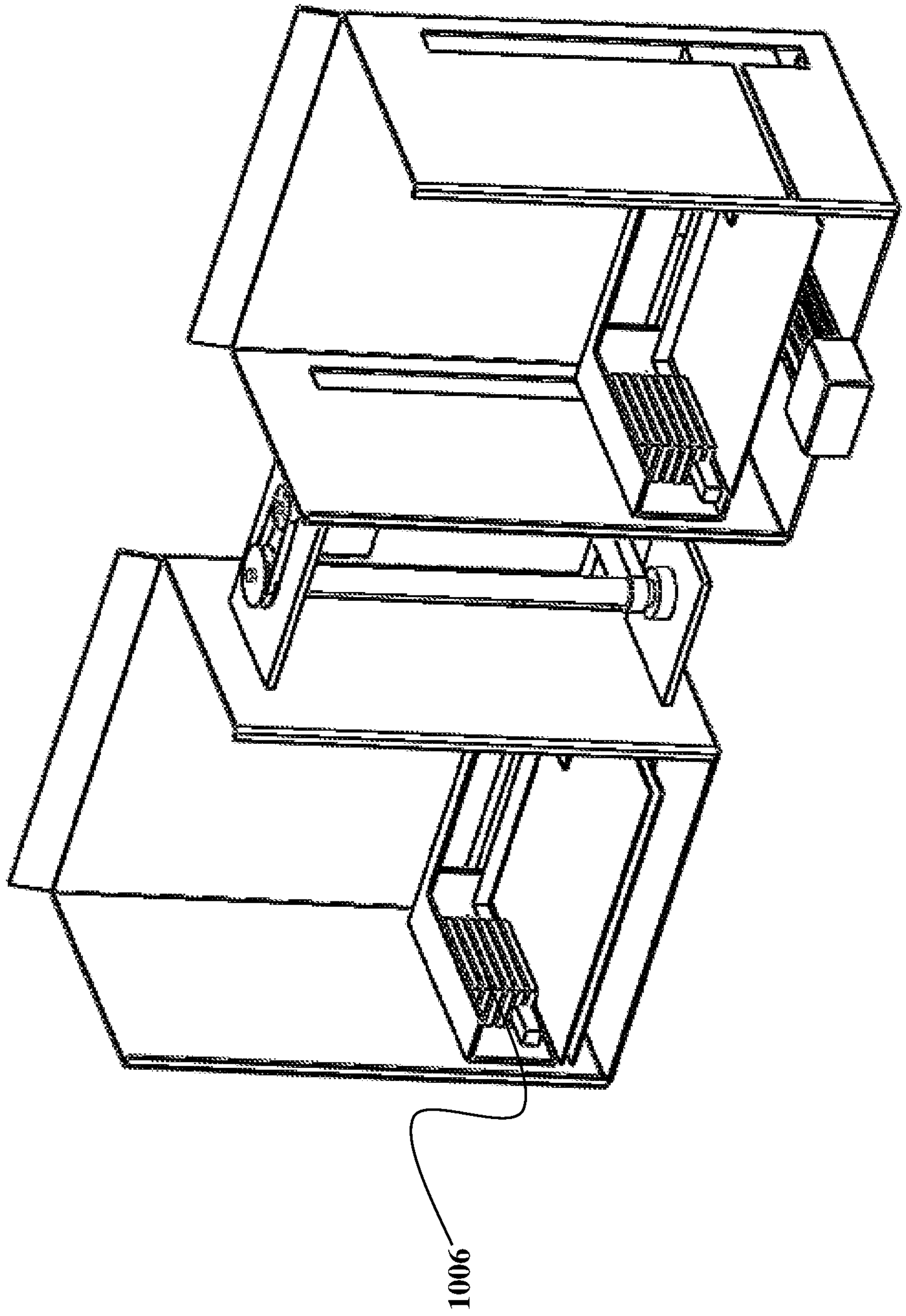
Figure 10C:
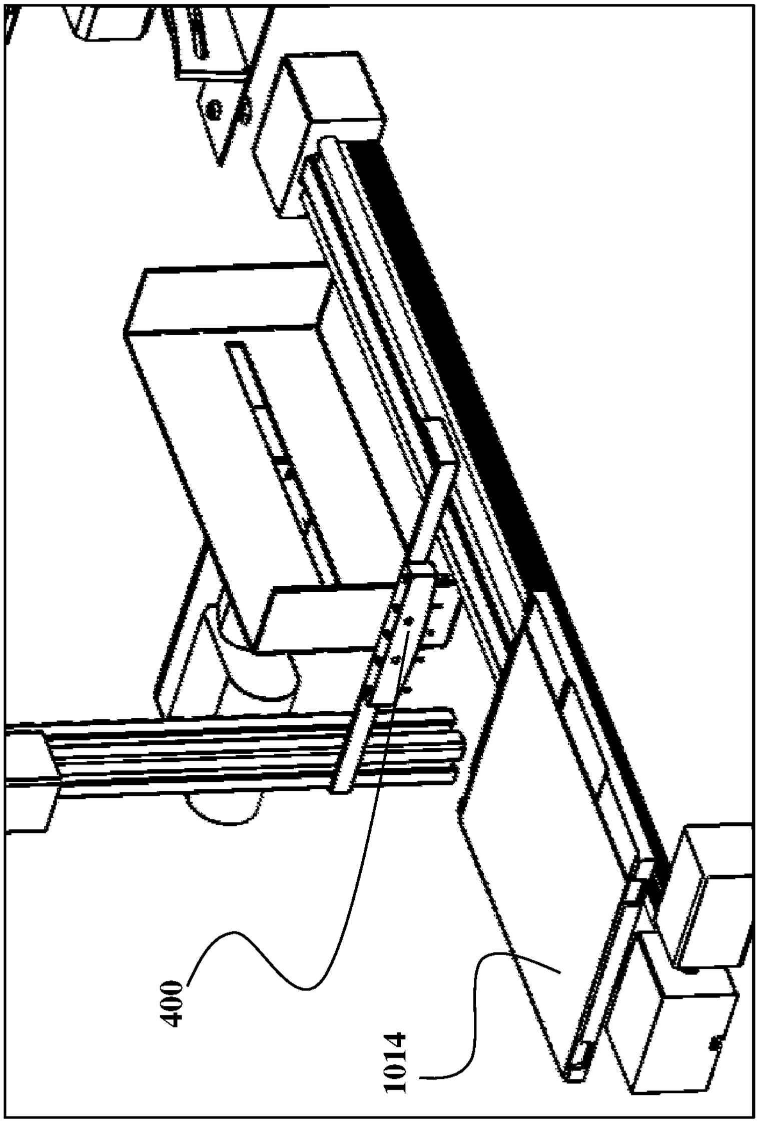

FIG. 10A shows a unique slide transport system 1000 that is associated with the coverslipper device 200 as disclosed herein as an example embodiment. The coverslipper device 200 is mounted on a frame defined by a X axis drive 1010 and a Y axis drive 1012. The slide transport components include an input/output tray module 1002 and 1004, slide racks 1006 as shown in FIG. 10B, containing stained slides 106 as the input 1002, both the input and output racks 1002 and 1004 move together (up/down) simultaneously and contains actuators 802 for movement of required slide 106. About the slide conveyor 1014 and dispensing module 400, as shown in FIG. 10C, the slide conveyor has slide bed on top of slide conveyor 1014 that comprises the slots for large format slides that are provided to ensure the slide 104 sits on this platform while ejected from the input tray 1002 and ejected back to output tray 1002 after coverslipping. As far as the dispensing is concerned, as the slide 104 start moving towards coverslipping zone 608, mountant dispensation happens on the slide 104. Here, the mountant dispense module is stationed and dispensation happens while the slide conveyor 1014 moves. The slide ejector module 1008 comprises of a linear motion is introduced to push the slide from input tray 1002 to the slide conveyor 1014 bed and push into the output tray 1004 from slide conveyor 1014 bed after coverslipping process is done.

Figure 11:
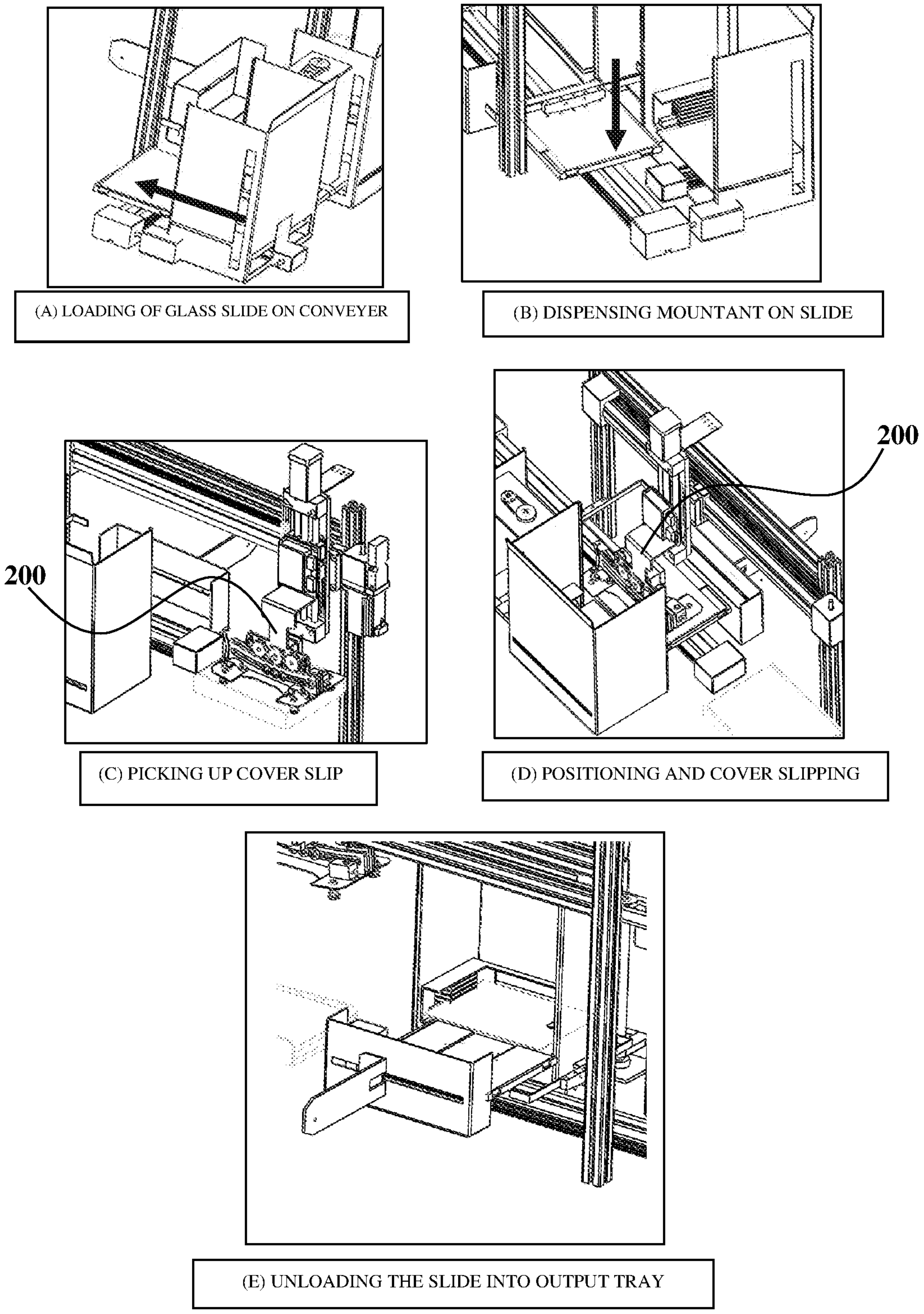
FIG. 11 shows the sequence of operations using the slide transport system that is associated with the coverslipper, as disclosed herein as an example embodiment.

Referring to FIGS. 11 and 12, FIG. 11 shows the sequence of operations using the slide transport system that is associated with the coverslipper device 200 as disclosed herein as an example embodiment. The loading of glass slide 106 on slide conveyor 1014 is initiated as a first step. In a second step, the mountant medium 104 is dispensed over the slide 106. In a third step, the coverslip 102 is picked up. In a fourth step, the positioning and coverslipping action is performed. In the fifth step, the slide 106 is unloaded into output tray 1004. FIG. 12 shows the working of the wedge-shaped nozzle 400 of the coverslipper device 200, as an example embodiment of the present disclosure. FIG. 12 shows an arrangement comprising of a linear mechanism and a container/tray 1202 and 1204 filled with Xylene moving in vertical direction, in combination with the wedge-shaped nozzle 400 moving linear mechanism, which ensures that the nozzle 400 tip is immersed into Xylene in between and after dispensation.

In other words, the coverslipper device 200 is assembled onto a frame and designated to move from one or more zones. The input zone 602 comprises a slide tray 1002, where the slide tray 1002 comprises a stack of stained slides 106, and a slide 106 is designated to be picked up by a coverslipper device 200 from a slide pick-up platform. The slide 106 picked up from the slide pick-up platform reaches the dispensation zone 604, and a mountant medium 104 is dispensed via a wedge-shaped nozzle 400. The slip pick-up zone 606, wherein the coverslipper device 200 picks the cover slips 102 stacked in a coverslip tray 616 of the slip pick-up zone 606 and moves to the coverslipping zone 608. The slide pick-up platform positions itself in the coverslipping zone 608 while the picked coverslip 102 is mounted over the slide 106. The processed cover slipped slide 106 is transported by a slide conveyor 1014 and inserted into a slide tray 1002, which is moved up and down and is positioned to accommodate the next processed slide 106.

Figure 13A:
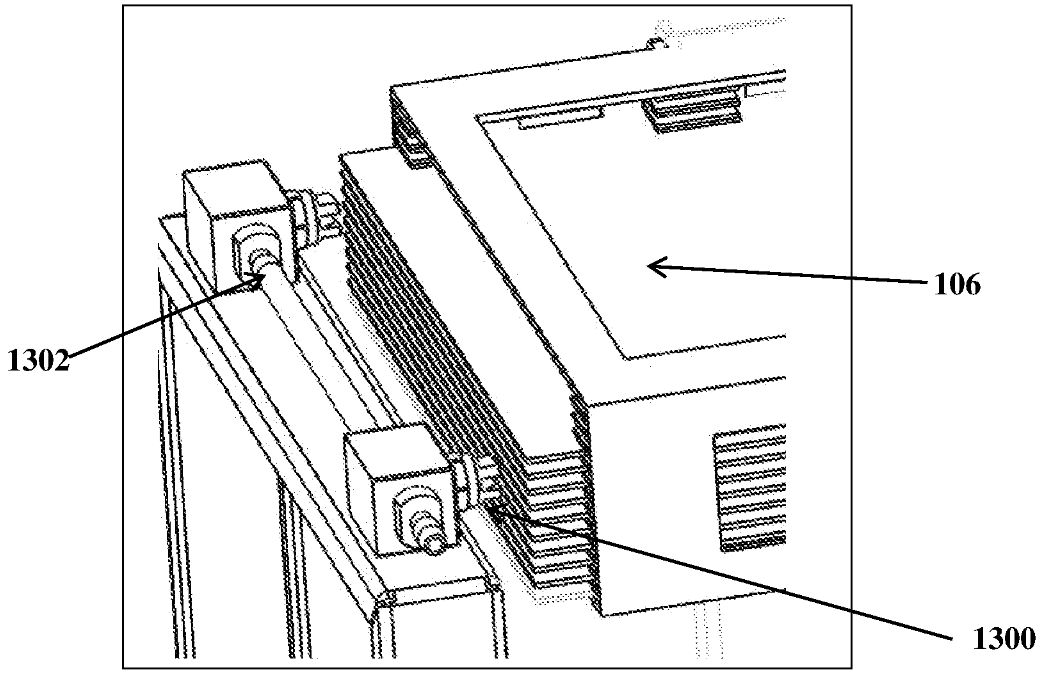
FIGS. 13A-13C show an arrangement comprising a spray nozzle with manifold setup of the coverslipper and a schematic associated with the spray nozzle manifold setup, as an example embodiment of the present disclosure.
Figure 13B:
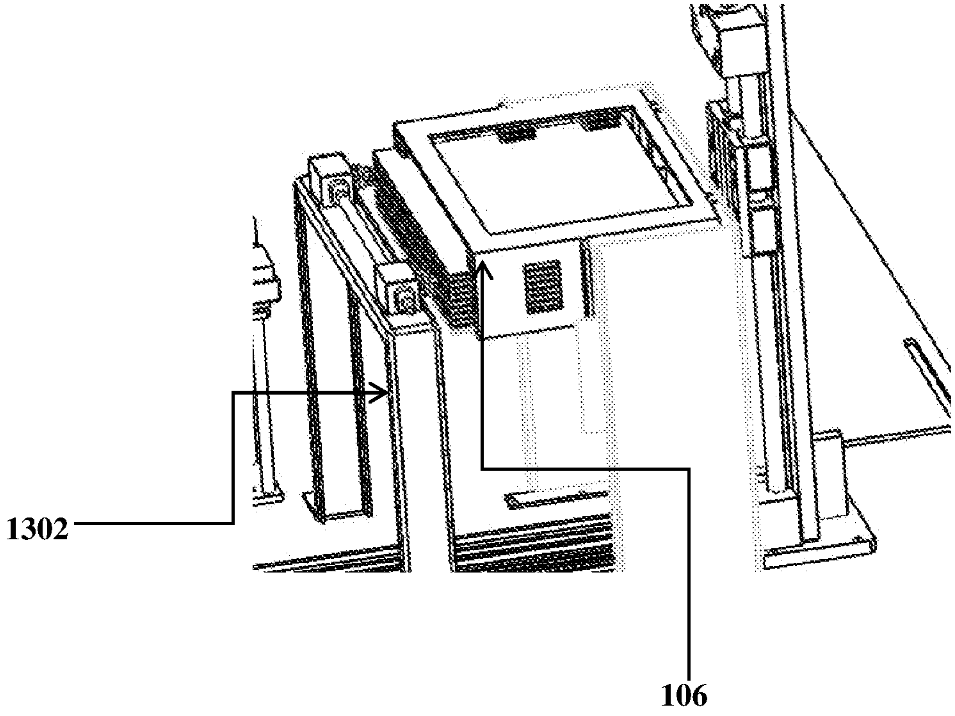
Figure 13C:
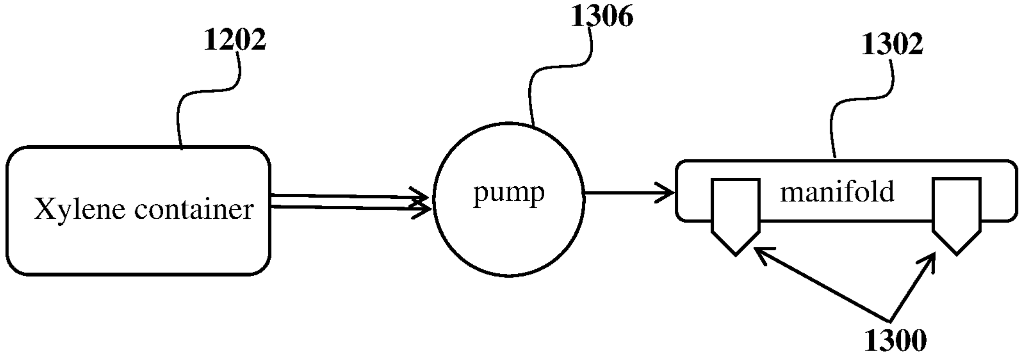

FIGS. 13A-13C show an arrangement comprising a spray nozzle 1300 with manifold 1302 setup of the coverslipper 200 and a schematic associated with the spray nozzle 1300 manifold setup, as an example embodiment of the present disclosure. The spray nozzle 1300 with manifold 1302 setup sprays Xylene on the slides housed by the input slide tray 1002 to ensure that the slides 106 and the tissues on the slides 106 are moistened with the Xylene liquid and hence facilitate seamless placement of the coverslip 102 over the slide 106 while preventing air bubble/pocket formation. As shown in FIG. 13B, when the input slide tray 1002 with slides 106 are loaded on the input tray 1002, the tray is moved downwards, and xylene pump 1306 gets initiated and xylene gets sprayed onto the slides 106 one by one on all slides 106 on the input tray 1002.

Figure 14:
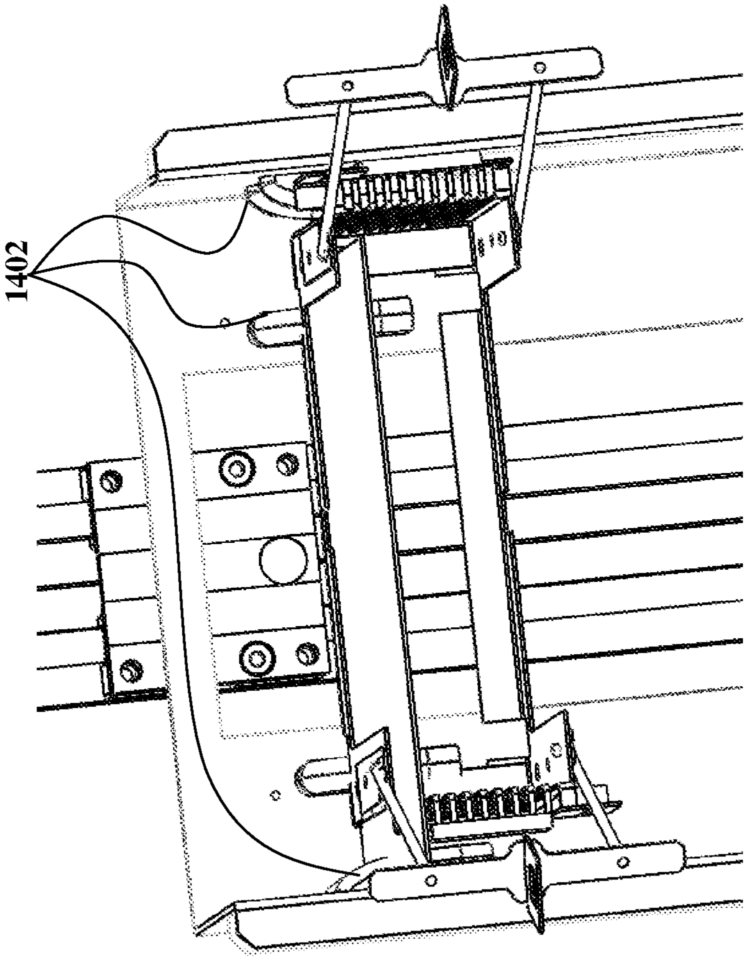
FIG. 14 shows a combination of multiple curved members strategically positioned around the mounting area of the slide rack to position and align all the slides in the slide rack in synchronization with one another, as an example embodiment of the present disclosure.
Figure 15A:
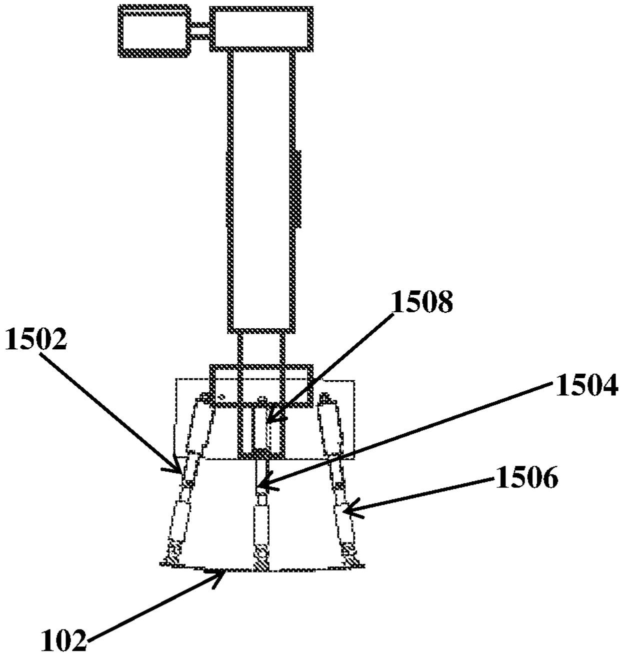
FIGS. 15A and 15B show a combination of one or more independent linear actuators holding the vacuum suction cups forming a programmable curved locus between the positions of the vacuum suction cups to pick the coverslip and place over the slide, as an example embodiment of the present disclosure.
Figure 15B:
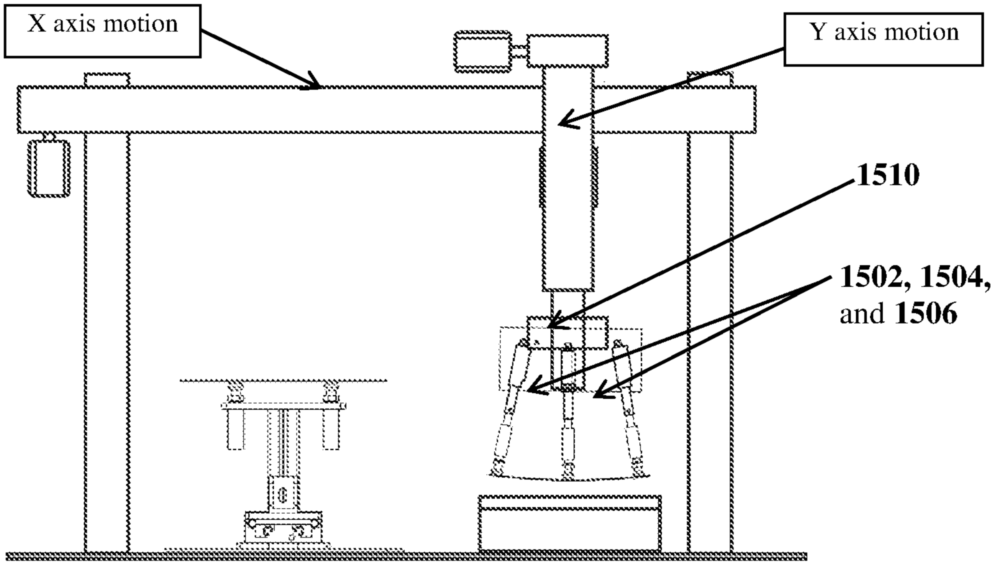

FIG. 14 shows a combination of multiple curved members 1402 strategically positioned around the mounting area of the slide rack 1006 to position and align all the slides 106 in the slide rack 1006 in synchronization with one another. In combination with vacuum suction cups 210 on the slide transporting platform, this alignment ensures that the orientation, alignment, and centre of the slides 106 are in line with that of the coverslip 102 when the coverslip 102 is placed over the slide 106. FIGS. 15A and 15B show a combination of one or more independent linear actuators 1502, 1504, and 1506 holding the vacuum suction cups 210 forming a programmable curved locus between the positions of the suction cups 210 to pick the coverslip 102 and place over the slide 106. The three linear actuators 1502, 1504, and 1506 are mounted in a custom pattern to pick the coverslip 102. The actuators 1502, 1504, and 1506 are actuated in a serial manner in such away actuator-1 1502 retracts and pick one end of the coverslipper 200 followed by actuator-2 1504 and actuator-3 1506 that picks up middle and opposite end of coverslip 200. The algorithm controls the rotary axis motion 1510 and the actuators 1502, 1504, and 1506 gently pick the coverslip 102 in a predefined manner. Furthermore, an X axis and Y axis are deputed to perform transport of coverslip 102 to next zone for coverslipping.

Figure 16A:
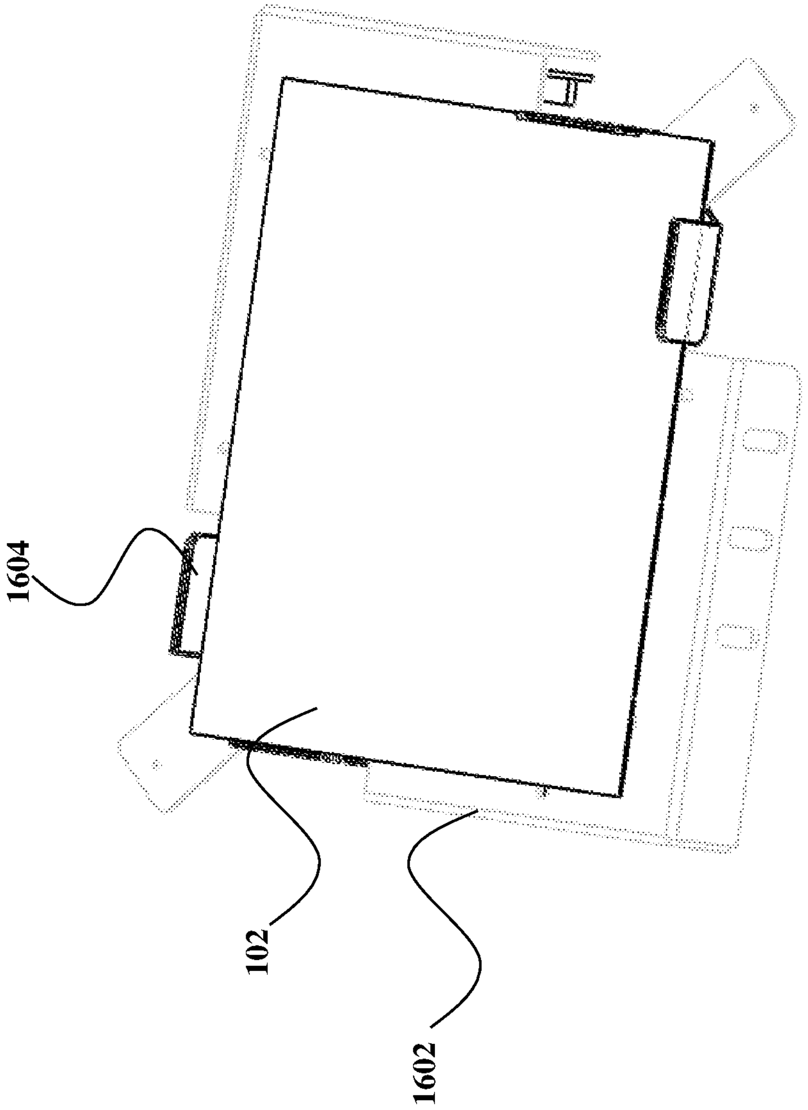
FIGS. 16A and 16B show perspective views of the coverslip tray and aligners, as an example embodiment of the present disclosure.
Figure 16B:
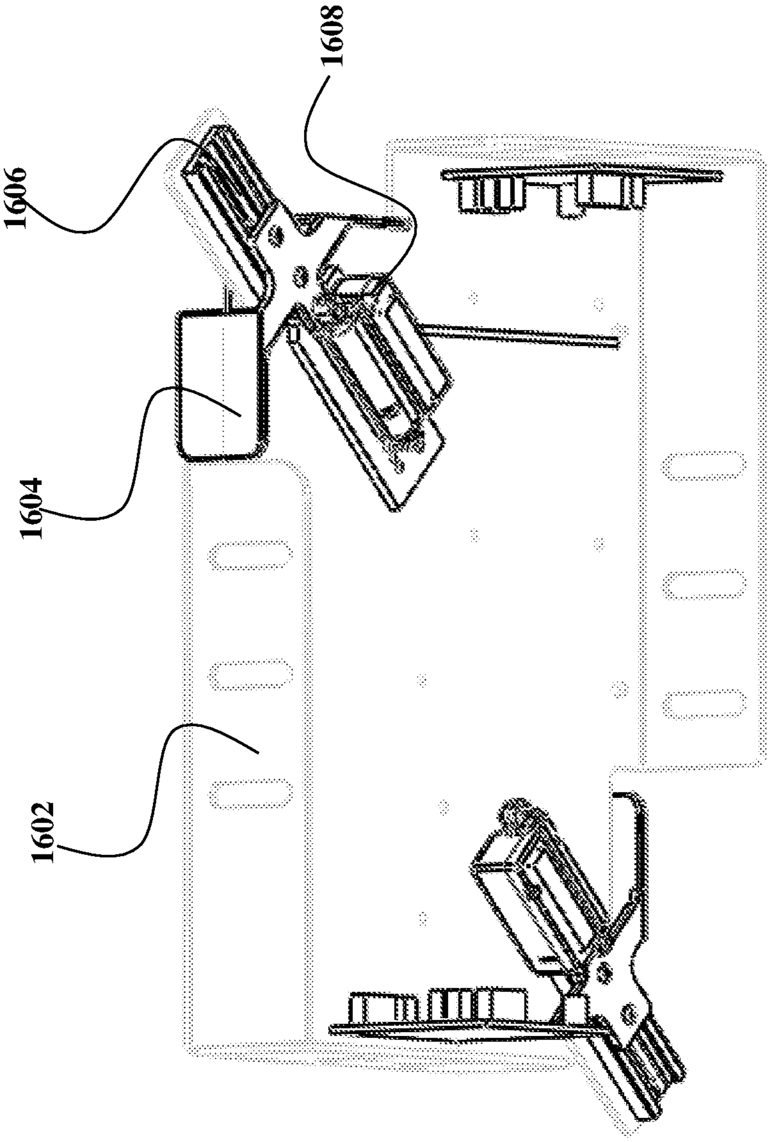

FIGS. 16A and 16B show perspective views of the coverslip tray 1602 and coverslip aligners 1604, as an example embodiment of the present disclosure. The coverslips 102 are stacked in the coverslip tray 1602 and since the coverslips 102 are made of glass, the surface is smooth, which causes the coverslips 102 on stack to tend to slip when a topmost coverslip 102 is picked from the coverslip trays 1602, which causes the edge reference of the coverslip 102 to change and facilitate laying of the coverslip 102. Considering this, the edge of coverslip 102 and slide 106 won't be at same reference, and therefore prevents breakage of the coverslip 102 and the tissue sample being un-used. The coverslip 102 alignment mechanism is built with custom designed coverslip tray 1602 with alignment mechanism diagonally mounted for aligning coverslips 102 on each process/pickup. The coverslip tray 1602 is in built with coverslip aligners 1604 which are connected to linear actuators 1608, along with a linear slide guide 1606, and controlled by control software. The process of picking coverslip 102 involves:

1. System initialises, which extracts the coverslip aligners 1604, enabling the used to load stack of coverslips 102.
2. Once, the coverslips 102 are stacked and system initialises and aligns all stacked coverslips 102 ensuring the coverslips 102 are in same reference line.
3. During picking function, once the topmost coverslip 102 is picked by vacuum suction cups 210, the coverslip aligners 1604 relax, enabling coverslip 102 to be picked up gently.
4. After picking, the coverslipper device 200 moves to coverslipping zone 608, while the coverslip aligners 1604 retract and aligns/hold the coverslip 102 stack on same reference.
5. The above function enables the system to pick the coverslips 102 at same reference point.

Figure 17A:
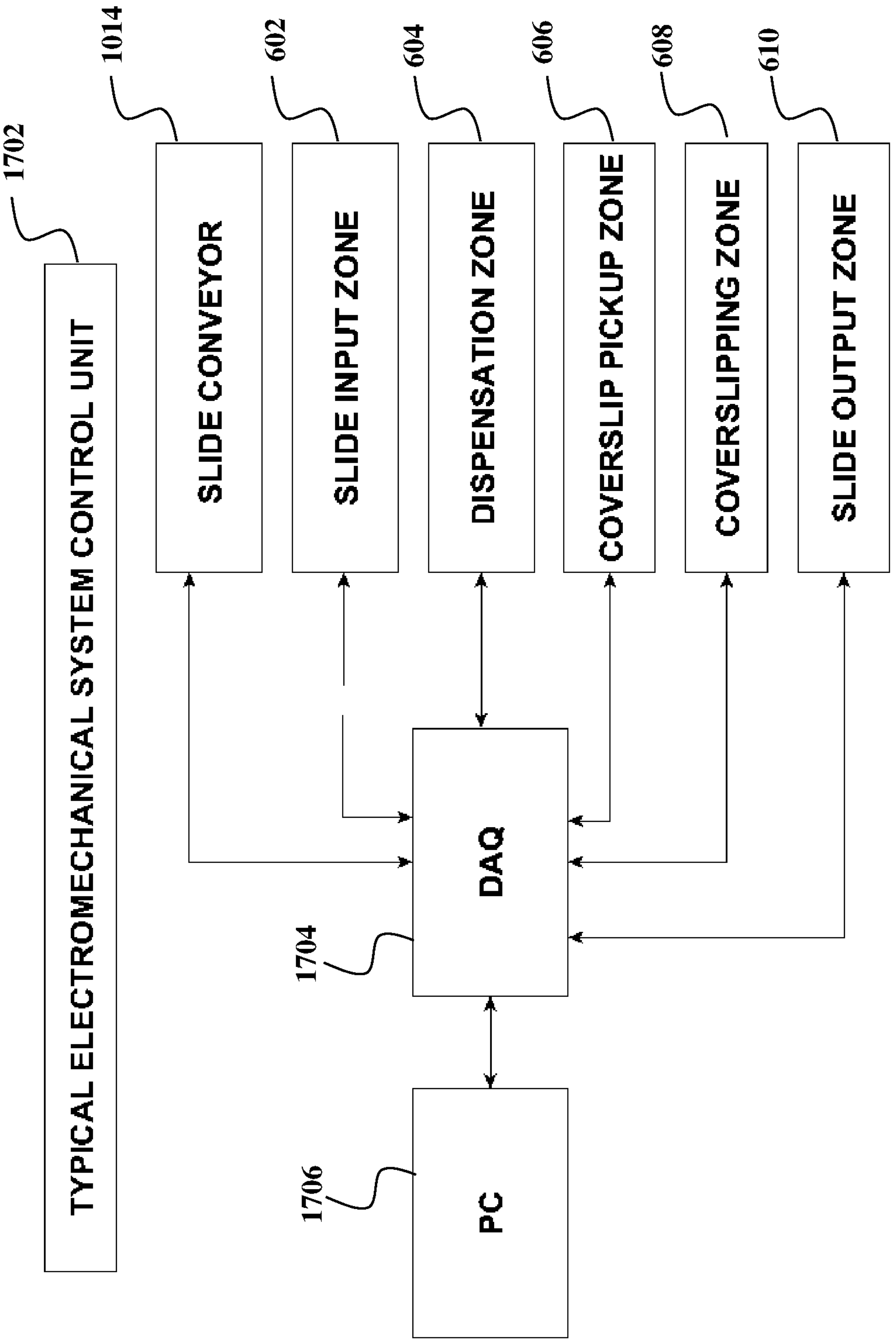
FIG. 17 shows a schematic drawing that illustrates an electromechanical system control unit associated with the system architecture of the coverslipper device, as an example embodiment of the present disclosure.
Figure 17B:
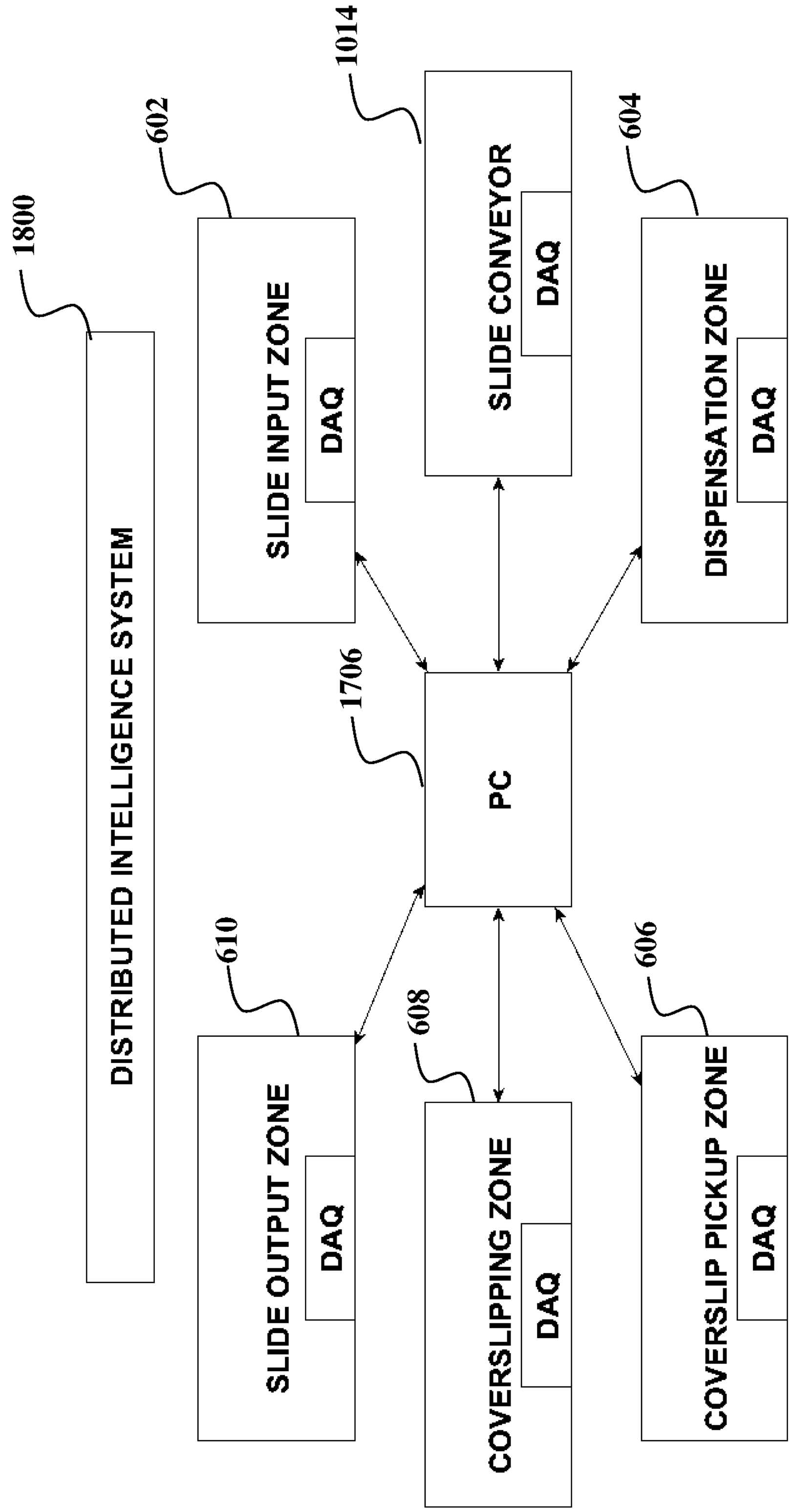

FIG. 17 shows a schematic drawing that illustrates an electromechanical control system 1702 associated with the system 600 architecture of the coverslipper device 200, as an example embodiment of the present disclosure. As known in the art, an electromechanical control system 1702 comprises of a data acquisition (DAQ) device 1704 controlled by a personal computer (PC) 1706 that acquires data from different sensors and generate control signals for driving motors, controlling pneumatic systems, etc. The motors, sensors, and pneumatic systems from each zone of the coverslipper system 600 must be controlled by a single, central DAQ device 1704 which requires very high processing power and communication bandwidth. Therefore, the DAQ device 1704 with the help of the PC 1706 controls the slide conveyor 1014, slide input zone 602, dispensation zone 604, slip pick-up zone 606, coverslipping zone 608, and output zone 610. Also, the motors, sensors, and pneumatic systems from each zone of the coverslipper system 600 are physically connected to the DAQ device 1704 to reduce complexity in cable routing and to increase overall system footprint.

FIG. 18 shows a schematic drawing that illustrates a distributed intelligence system 1800 associated with the system 600 architecture of the coverslipper device 200, as an example embodiment of the present disclosure. The distributed intelligence system 1800 has a dedicated DAQ device 1704 for each zone. These DAQ devices 1704 are programmed specifically to perform functions intended only for that zone that is selected from one of slide input and output zone 602 and 610, coverslipping zone 608, slide conveyor 1014, slip pick-up zone 606, and dispensation zone 604. For example, the slip pick-up zone 606 shall have a DAQ device 1704 that would be programmed to perform the coverslip picking operation. This system 600 design minimizes the need for high bandwidth, simplifies the cable routing and reduces system footprint.

As disclosed in the present disclosure, the cover slips 102 are small squares of glass that cover the specimen placed on the microscope slide. They flatten the specimen for a better visibility and decrease the rate of evaporation from the sample, both in wet and dry mounted slides. If a stain or other liquid has been added, the coverslip 102 keeps it on the specimen. Coverslips 102 also protect the specimens from contamination by airborne particles or other substances. The coverslips 102 are of different shapes and sizes as per the requirement during microscopic examination of a biological material. These may be rectangular, may be circular/round with different diameters. The most used coverslips 102 are rectangular shape of about 1 inch by 3-inch size. The coverslip 102 or cover glass serves in improving the quality of diagnosis during examination by providing following benefits:

Prevents contact between the microscope's objective lens and the specimen.

Provides an even thickness (in wet mounts) for viewing depth.

Viewing enhancement as the specimen is flattened.

Deceleration of evaporation from the sample, both in wet and dry mounted slides.

Permanent affixation for long term and repeated use of permanent specimens.

Furthermore, the coverslipper device 200 enables specimens in large format sizes to be protected and stored for years together. The coverslipper device 200 economizes the coverslipping process by way of implementing indigenously conceived ideas and developed algorithms. The coverslipper device 200 is versatile enough to support multiple sizes of slides, which is not developed anywhere in the world. The coverslipper device 200 has capability to process large format coverslips 102 and, again, is not developed anywhere in the world.

As will be appreciated by one of skill in the art, the present disclosure may be embodied as a method and system. Accordingly, the present disclosure may take the form of an entirely hardware embodiment, a software embodiment or an embodiment combining software and hardware aspects. It will be understood that the functions of any of the units as described above can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts performed by any of the units as described above.

Instructions may also be stored in a computer-readable memory that can direct a computer or other programmable data processing apparatus to function in a particular manner, such that the instructions stored in the computer-readable memory produce an article of manufacture including instruction means which implement the function/act performed by any of the units as described above.

In the specification, there has been disclosed exemplary embodiments of the invention. Although specific terms are employed, they are used in a generic and descriptive sense only and not for purposes of limitation of the scope of the invention.

We claim:

1. A system for performing coverslipping, the system comprising:

a frame;

a wedge-shaped nozzle;

a slide pick-up platform;

a coverslip tray;

a slide conveyor;

a plurality of zones; and a coverslipper device; wherein the plurality of zones includes an input zone, a dispensation zone, a slip pick-up zone, a coverslipping zone and an output zone;

the coverslipper device is assembled onto the frame and is configured to move between zones of the plurality of zones;

the input zone comprises an input zone slide tray;

the input zone slide tray comprises a stack of stained slides;

the coverslipper device is configured to pick up a slide from the slide pick-up platform and transport the picked up slide to the dispensation zone;

the wedge-shaped nozzle is configured to dispense an amount of a mountant medium onto the picked slide in the dispensation zone;

the coverslip tray is disposed in the slip pick-up zone and comprises a stack of cover slips;

the coverslipper device is configured to pick a cover slip of the stack of cover slips and transport the picked coverslip to the coverslipping zone;

the slide pick-up platform is configured to move in the coverslipping zone;

the coverslipper device is configured to mount the picked coverslip over the picked up slide in the coverslipping zone;

the slide conveyor is configured to transport the mounted coverslip slide to the output zone;

the output zone comprises an output zone slide tray;

the slide conveyor is configured to insert the transported mounted coverslip slide into the output zone slide tray; and the output zone slide tray is configured to move up and down accommodate a subsequent mounted coverslip slide.

2. The system of claim 1, wherein the coverslipper device is configured to pick up a slide from the slide pick up platform and transport the picked up slide to the dispensation zone, the slide having a size from the group consisting of 6"×8" 5"×7" 1"×3" and 2"×3".

3. The system of claim 1, wherein the slide tray comprises evenly spaced grooves into which the stained slides are inserted.

4. The system of claim 1, wherein the wedge-shaped nozzle is configured to dispense an amount of mountant medium from a container uniformly over the picked up slide in the dispensation zone.

5. The system of claim 1, further comprising a dispenser nozzle park zone, a home position and a plurality of solvent containers and nozzle tips, and wherein the wedge-shaped nozzle, after dispensing, is configured to rest at the home position;

the plurality of solvent containers are configured to prevent clogging of the nozzle tips;

the wedge-shaped nozzle is partially immersed in a solvent of a solvent container of the solvent containers.

6. The system of claim 1, wherein the coverslipper device comprises a pick and place mechanism controlled by a dedicated algorithm to facilitate accurate and uniform placement, and to prevent or eliminate formation of air bubbles.

7. The system of claim 1, further comprising an actuator configured to move linearly at a predefined speed and configured to induce the wedge-shaped nozzle to dispense the amount of the mountant medium onto the picked slide in the dispensation zone, and after the dispensing, the actuator is configured to retreat to a home position, wherein wedge-shaped nozzle comprises a tip immersed into the mountant medium contained in a tray to avoid drying of nozzle tip.

8. The system of claim 1, further comprising a processor having a first algorithm which when executed by the processor cause the processor to:

monitor real time suction pressure in a line supplying suction force to vacuum suction cups;

sense a vertical position;

detect picking-up of the coverslip based on build-up of suction pressure; and once the suction pressure crosses a threshold, stop a vertical downward motion of the coverslipper device.

9. The system of claim 8, further comprising a sensing system programmed with a second algorithm, which when executed by the processor cause the system to pick each slide and to provide feedback to the processor for performing a subsequent operation.

10. The system of claim 1, wherein the coverslipper device comprises:

a vertical plate comprising a pinion gear and a side connected to a shaft, wherein the pinion gear is configured to rotate on the shaft;

a first curved plate comprising a lowers ide and a rack gear on top, wherein the pinion gear is configured to rotate over the rack gear; and a second curved plate comprising a set of vacuum suction cups and attached below the first curved plate, wherein the set of vacuum suction cups are attached to the lower side of the second curved plate;

rotation of the pinion gear over the rack gear translates the second curved plate along a predefined path, and the vacuum suction cups are configured to detachably attach to a cover slip from a first end to a second end of the coverslip and lift the attached cover slip.

11. The system of claim 10, further comprising a processor comprising a simultaneous multi-axis motion algorithm which when executed by the processor cause the processor to achieve the predefined path of the second curved plate, enable a unique locus of motion, and prevent occurrence of air pockets and bubbles below the cover slip.

12. The system of claim 11, wherein the predefined path of the second curved plate is a rolling motion over 3-D space along three mutually perpendicular directions.

13. The system of claim 10, further comprising a processor including instructions which when executed by the processor cause:

the wedge-shaped nozzle to dispense a mountant medium on a selected slide;

the coverslipper device to:

position a selected coverslip having a first end and second end directly above the selected slide and exactly matching a position of the selected slide, bring the first end towards the selected slide and place the first end on the selected slide, roll towards the second end such that the mountant medium spreads all over the selected slide uniformly; and the vacuum suction cups to release suction such that the selected coverslip releases from the coverslipper device.

14. The system of claim 10, wherein:

the coverslip alignment mechanism comprises a custom designed coverslip tray having an alignment mechanism diagonally mounted for aligning a coverslip during each pickup of the coverslip;

the coverslips are stacked in the coverslip tray;

the coverslips are made of glass with a smooth surface; and the edge reference of coverslip defines a first reference and the slide defines a second reference different from the first reference.

15. The system of claim 14, wherein the coverslip tray comprises coverslip aligners connected to linear actuators and controlled by control software.

16. The system of claim 15, further comprising an electromechanical control system comprising a plurality of a data acquisition devices (DAQ) configured to acquire data from a plurality of sensors and and generate control signals for driving motors and controlling pneumatic systems, wherein each zone of the plurality of zone comprises a corresponding data acquisition device (DAQ) of the plurality of data acquisition devices.

17. The system of claim 16, further comprising a distributed intelligence system comprising the plurality of data acquisition devices (DAQ) comprising an input zone DAQ, output zone DAQ, a coverslipping zone DAQ, a slip pick-up zone DAQ, and a dispensation zone DAQ.

* * * * *